US008639578B2

(12) United States Patent
Barber et al.

(10) Patent No.: US 8,639,578 B2
(45) Date of Patent: Jan. 28, 2014

(54) DISK DISPENSING AND RETRIEVAL SYSTEM AND ASSOCIATED METHODS

(75) Inventors: William H. Barber, Thousand Oaks, CA (US); Philip J. Tomasi, Newbury Park, CA (US)

(73) Assignee: Redbox Automated Retail, LLC, Bellevue, WA (US)

( * ) Notice: Subject to any disclaimer, the term of this patent is extended or adjusted under 35 U.S.C. 154(b) by 421 days.

(21) Appl. No.: 12/257,193

(22) Filed: Oct. 23, 2008

(65) Prior Publication Data

US 2009/0048932 A1 Feb. 19, 2009

Related U.S. Application Data

(63) Continuation of application No. 09/578,631, filed on May 25, 2000, now Pat. No. 7,444,296.

(60) Provisional application No. 60/135,854, filed on May 25, 1999, provisional application No. 60/143,601, filed on Jul. 13, 1999.

(51) Int. Cl.
*G06Q 20/00* (2012.01)
*G06Q 30/00* (2012.01)
*G06F 7/00* (2006.01)
*G01G 23/18* (2006.01)
*G06M 1/06* (2006.01)
*G07G 1/00* (2006.01)

(52) U.S. Cl.
USPC .............. 705/17; 705/26.1; 700/213; 235/1 R

(58) Field of Classification Search
None
See application file for complete search history.

(56) References Cited

U.S. PATENT DOCUMENTS

| 4,598,810 A | 7/1986 | Shore et al. |
| 4,608,679 A | 8/1986 | Rudy et al. |
| 4,789,045 A | 12/1988 | Pugh |
| 4,812,629 A | 3/1989 | O'Neil et al. |
| 4,814,592 A | 3/1989 | Bradt et al. |
| 4,839,505 A | 6/1989 | Bradt et al. |

(Continued)

FOREIGN PATENT DOCUMENTS

| JP | 11-53638 C | 6/1983 |
| JP | 07182659 | 7/1995 |

(Continued)

OTHER PUBLICATIONS

131 Affidavit & Exhibits in U.S. Appl. No. 09/578,631, filed Aug. 27, 2007, 163 pages.

(Continued)

*Primary Examiner* — Asfand Sheikh
(74) *Attorney, Agent, or Firm* — Perkins Coie LLP

(57) ABSTRACT

A kiosk dispenses and receives recorded optical disk media using an interconnected system central server computer through an Internet Service Provider. The system central server contains databases and processing, and is connected to a credit verification system. The central databases collect inventory administration information and customer data from the kiosks including credit card and email addresses. The central server initiates credit verification and sends receipts to customers via email. The central server maintains databases that are used for remote inventory control and administration of the kiosk network. A kiosk has the capability to identify a recorded disk for automated restocking and may also perform quality assessment of a recorded disk. A kiosk may also provide publishing-on-demand or-act as a portal for remotely served advertisement.

10 Claims, 12 Drawing Sheets

(56) References Cited

U.S. PATENT DOCUMENTS

| | | | |
|---|---|---|---|
| 4,839,875 A | 6/1989 | Kuriyama et al. | |
| 4,858,743 A | 8/1989 | Paraskevakos et al. | |
| 4,860,876 A | 8/1989 | Moore et al. | |
| 4,866,661 A | 9/1989 | de Prins | |
| 4,872,154 A | 10/1989 | Sakagami et al. | |
| 4,893,705 A | 1/1990 | Brown | |
| 4,896,024 A | 1/1990 | Morello et al. | |
| 4,903,815 A | 2/1990 | Hirschfeld et al. | |
| 4,915,205 A | 4/1990 | Reid et al. | |
| 4,967,403 A | 10/1990 | Ogawa et al. | |
| 4,995,498 A | 2/1991 | Menke | |
| 5,007,518 A | 4/1991 | Crooks et al. | |
| 5,013,897 A | 5/1991 | Harman et al. | |
| 5,028,766 A | 7/1991 | Shah | |
| 5,088,586 A | 2/1992 | Isobe et al. | |
| 5,095,195 A | 3/1992 | Harman et al. | |
| 5,107,667 A | 4/1992 | Tone et al. | |
| 5,133,441 A | 7/1992 | Brown | |
| 5,159,560 A | 10/1992 | Newell et al. | |
| 5,273,183 A | 12/1993 | Tuttobene | |
| 5,319,705 A | 6/1994 | Halter et al. | |
| 5,418,713 A | 5/1995 | Allen | |
| 5,445,295 A * | 8/1995 | Brown | 221/3 |
| 5,459,306 A | 10/1995 | Stein et al. | |
| 5,576,951 A | 11/1996 | Lockwood | |
| 5,613,620 A | 3/1997 | Center et al. | |
| 5,633,839 A | 5/1997 | Alexander et al. | |
| 5,644,727 A | 7/1997 | Atkins | |
| 5,647,505 A | 7/1997 | Scott | |
| 5,685,423 A | 11/1997 | Hunt | |
| 5,699,262 A | 12/1997 | Lang et al. | |
| 5,715,403 A | 2/1998 | Stefik | |
| 5,724,521 A | 3/1998 | Dedrick | |
| 5,739,512 A | 4/1998 | Tognazzini | |
| 5,748,485 A | 5/1998 | Christiansen et al. | |
| 5,761,071 A | 6/1998 | Bernstein et al. | |
| 5,769,269 A | 6/1998 | Peters | |
| 5,822,216 A | 10/1998 | Satchell, Jr. et al. | |
| 5,822,291 A | 10/1998 | Brindze et al. | |
| 5,826,267 A | 10/1998 | McMillan | |
| 5,844,727 A | 12/1998 | Partlo | |
| 5,844,808 A * | 12/1998 | Konsmo et al. | 700/244 |
| 5,847,957 A | 12/1998 | Cohen et al. | |
| 5,848,593 A | 12/1998 | McGrady et al. | |
| 5,850,442 A | 12/1998 | Muftic | |
| 5,860,362 A | 1/1999 | Smith | |
| 5,875,110 A | 2/1999 | Jacobs | |
| 5,900,608 A | 5/1999 | Iida | |
| 5,934,439 A | 8/1999 | Kanoh et al. | |
| 5,938,510 A | 8/1999 | Takahashi et al. | |
| 5,943,423 A | 8/1999 | Muftic | |
| 5,950,173 A | 9/1999 | Perkowski | |
| 5,956,876 A | 9/1999 | Burdette et al. | |
| 5,971,273 A | 10/1999 | Vallaire | |
| 5,988,346 A * | 11/1999 | Tedesco et al. | 194/217 |
| 6,032,130 A | 2/2000 | Alloul et al. | |
| 6,072,766 A | 6/2000 | Konshak | |
| 6,109,524 A | 8/2000 | Kanoh et al. | |
| 6,119,932 A | 9/2000 | Maloney et al. | |
| 6,123,223 A * | 9/2000 | Watkins | 221/121 |
| 6,169,483 B1 | 1/2001 | Ghaffari et al. | |
| 6,182,857 B1 | 2/2001 | Hamm et al. | |
| 6,201,474 B1 | 3/2001 | Brady | |
| 6,209,787 B1 | 4/2001 | Iida | |
| 6,264,104 B1 | 7/2001 | Jenkins et al. | |
| 6,286,139 B1 | 9/2001 | Decinque | |
| 6,289,322 B1 | 9/2001 | Kitchen et al. | |
| 6,321,984 B1 | 11/2001 | McCall et al. | |
| 6,327,230 B1 | 12/2001 | Miller et al. | |
| 6,330,491 B1 | 12/2001 | Lion | |
| 6,336,098 B1 | 1/2002 | Fortenberry et al. | |
| 6,366,914 B1 | 4/2002 | Stern | |
| 6,424,706 B1 | 7/2002 | Katz et al. | |
| 6,434,326 B1 | 8/2002 | Kondo et al. | |
| 6,493,110 B1 | 12/2002 | Roberts | |
| 6,513,015 B2 | 1/2003 | Ogasawara | |
| 6,539,417 B2 | 3/2003 | Stern | |
| 6,554,184 B1 | 4/2003 | Amos | |
| 6,584,450 B1 | 6/2003 | Hastings et al. | |
| 6,688,523 B1 | 2/2004 | Koenck | |
| 6,702,540 B2 * | 3/2004 | Olin | 414/217 |
| 6,748,296 B2 | 6/2004 | Banerjee et al. | |
| 6,748,539 B1 | 6/2004 | Lotspiech | |
| 6,758,370 B2 | 7/2004 | Cooke | |
| 6,898,942 B2 | 5/2005 | Schanin | |
| 6,954,732 B1 | 10/2005 | DeLapa et al. | |
| 6,965,869 B1 | 11/2005 | Tomita et al. | |
| 7,058,581 B1 * | 6/2006 | Young | 705/16 |
| 7,085,727 B2 | 8/2006 | VanOrman | |
| 7,162,434 B1 | 1/2007 | Walker et al. | |
| 7,234,609 B2 | 6/2007 | DeLazzer et al. | |
| 7,313,692 B2 | 12/2007 | Weeks et al. | |
| 7,444,296 B1 | 10/2008 | Barber et al. | |
| 7,747,346 B2 | 6/2010 | Lowe et al. | |
| 7,774,233 B2 | 8/2010 | Barber et al. | |
| 7,787,987 B2 | 8/2010 | Kuehnrich et al. | |
| 8,060,247 B2 | 11/2011 | Kaplan et al. | |
| 2001/0011252 A1 | 8/2001 | Kasahara | |
| 2001/0037207 A1 | 11/2001 | Dejaeger | |
| 2002/0046122 A1 | 4/2002 | Barber et al. | |
| 2002/0095680 A1 | 7/2002 | Davidson | |
| 2003/0074106 A1 | 4/2003 | Butler | |
| 2004/0064371 A1 | 4/2004 | Crapo | |
| 2004/0243480 A1 | 12/2004 | Gross | |
| 2004/0249711 A1 | 12/2004 | Walker et al. | |
| 2005/0086127 A1 | 4/2005 | Hastings et al. | |
| 2005/0267819 A1 | 12/2005 | Kaplan | |
| 2007/0050266 A1 | 3/2007 | Barber et al. | |
| 2009/0139886 A1 | 6/2009 | Blust et al. | |
| 2010/0325001 A1 | 12/2010 | Barber et al. | |

FOREIGN PATENT DOCUMENTS

| | | |
|---|---|---|
| JP | 115599 | 2/1999 |
| WO | WO-0072160 A1 | 11/2000 |
| WO | WO-2006116112 | 2/2006 |
| WO | WO-2009032946 | 3/2009 |

OTHER PUBLICATIONS

131 Affidavit & Exhibits in U.S. Appl. No. 09/578,631, filed Apr. 16, 2004, 68 pages.

Office Action dated Nov. 19, 2007, U.S. Appl. No. 09/578,631, 30 pages.

Appeal Brief filed Apr. 18, 2008, U.S. Appl. No. 09/578,631, 216 pages.

Notice of Allowance issued Aug. 8, 2008, U.S. Appl. No. 09/578,631, 14 pages.

Office Action dated May 8, 2002, U.S. Appl. No. 09/578,631, 12 pages.

Office Action dated Dec. 19, 2002, U.S. Appl. No. 09/578,631, 16 pages.

Response to Office Action of Dec. 19, 2002, U.S. Appl. No. 09/578,631, filed Jun. 19, 2003, 32 pages.

Office Action dated Aug. 6, 2003, U.S. Appl. No. 09/578,631, 10 pages.

Response to Office Action of Aug. 6, 2003, U.S. Appl. No. 09/578,631, filed Nov. 6, 2003, 12 pages.

Office Action dated Jan. 2, 2004, U.S. Appl. No. 09/578,631, 12 pages.

Response to Office Action dated Jan. 2, 2004, U.S. Appl. No. 09/578,631, filed Apr. 16, 2004, 9 pages.

Office Action dated Jul. 22, 2004, U.S. Appl. No. 09/578,631, 10 pages.

Response to Office Action dated Jul. 22, 2004, U.S. Appl. No. 09/578,631, filed Jan. 4, 2005, 72 pages.

Office Action dated Mar. 30, 2005, U.S. Appl. No. 09/578,631, 9 pages.

Appeal Brief U.S. Appl. No. 09/578,631, filed Sep. 26, 2005, 45 pages.

(56) References Cited

OTHER PUBLICATIONS

Office Action dated Mar. 9, 2006, U.S. Appl. No. 09/578,631, 18 pages.
Response to Office Action dated Mar. 9, 2006, U.S. Appl. No. 09/578,631, filed Aug. 9, 2006, 38 pages.
Office Action dated Feb. 26, 2007, U.S. Appl. No. 09/578,631, 27 pages.
Response to Office Action dated Feb. 26, 2007, U.S. Appl. No. 09/578,631, filed Aug. 27, 2007, 26 pages.
Supplemental Appeal Brief filed May 22, 2008, U.S. Appl. No. 09/578,631, 5 pages.
Office Action dated Sep. 18, 2008, U.S. Appl. No. 09/903,444, 31 pages.
Letter Withdrawing a Notice of Defective Appeal Brief, U.S. Appl. No. 09/903,444, mailed Jul. 8, 2008, 2 pages.
Appeal Brief, U.S. Appl. No. 09/903,444, filed Dec. 18, 2008, 50 pages.
Comments on Statement of Reasons for Allowance filed Aug. 14, 2008, U.S. Appl. No. 09/578,631, 2 pages.
Office Action dated Oct. 1, 2008, U.S. Appl. No. 11/584,981, 12 pages.
Response to Office Action, U.S. Appl. No. 11/584,981, filed Feb. 2, 2009, 11 pages.
Office Action dated Sep. 30, 2008, U.S. Appl. No. 11/584,865, 13 pages.
Response to Office Action, U.S. Appl. No. 11/584,865, filed Feb. 2, 2009, 14 pages.
PCT/US2000/014398, International Search Report, 2 pages.
Office Action dated May 27, 2009, U.S. Appl. No. 11/584,981, 13 pages.
Office Action dated Apr. 1, 2009, U.S. Appl. No. 09/903,444, 59 pages.
Office Action dated May 26, 2009, U.S. Appl. No. 11/584,865, 17 pages.
Civil Action No. 1:08 cv 803, *DVDPlay, Inc.* v. *Redbox Automated Retail LLC*, Complaint (and Exh. A) filed Oct. 28, 2008, 53 pages.
Civil Action No. 1:08 cv 802, *DVDPlay, Inc.* v. *Coinstar E-Payment Services Inc. et al.*, Complaint (and Exh. A) filed Oct. 28, 2008, 53 pages.
Civil Action No. 1:08 cv 6183, *Redbox Automated Retail* v. *DVDPlay, Inc.*, Complaint filed Oct. 28, 2008, 4 pages.
Response (Appeal Brief) to Jan. 8, 2008 Office Action filed in related U.S. Appl. No. 09/903,444, filed on Jun. 9, 2008, 271 pages.
Selected Actions From File History of Related U.S. Appl. No. 09/903,444 from Nov. 10, 2006, Response to Present.
Selected Actions from File History of related U.S. Appl. No. 09/903,444 from filing to Sep. 27, 2006 Office Action.
Beauprez, Jennifer; Maker of Automated DVD-Sales Kiosks Targets College Students; Denver Post; Dec. 6, 1999.
Phillips, Blockbuster form DVD video rental alliance in the U.S., AFX Europe, Sep. 9, 1998.
Ingram Relaunches DVD Rental Kiosk Program, Updates Software Package, Video Store, vol. 20, No. 5, p. 8, Feb. 1, 1998.
Canadian Office Action for Application No. 2,605,563, Apr. 8, 2013, 4 pages.
Extended European Search Report for Application No. EP10810691, Mar. 6, 2013, 8 pages.
Extended European Search Report for Application No. EP10815879, Apr. 2, 2013, 5 pages.
"DVDINSIDER: DVDPlay Debuts First U.S. Automated Entertainment Machine—AEM-", DVD News, Apr. 10, 2003, 2 pages.
Appeal Brief, U.S. Appl. No. 09/903,444, filed Sep. 1, 2009, 292 pages.
Avery, Patrick, "Superstar Deployments", Self-Service World, Aug. 2007, 4 pages.
Decision on Appeal for U.S. Appl. No. 09/903,444, Appeal No. 2010-007450, Mar. 25, 2013, 28 pages.
Declaration of Jens Horstmann Under 37 CFR 1.132 with Exhibits, filed in Affidavit-submitted prior to Mar 15, 2013, U.S. Appl. No. 09/903,444, Oct. 31, 2007, 198 pages.
Declaration of Jens Horstmann Under 37 CFR 1.132 with Exhibits, filed in Affidavit-submitted prior to Mar 15, 2013, U.S. Appl. No. 09/903,444, Oct. 31, 2007, 6 pages.
Examiner's Answer to Appeal Brief, U.S. Appl. No. 09/903,444, filed Nov. 30, 2009, 59 pages.
Letter of Von Shows, CEO of Tejas Videos, Oct. 29, 2007, 1 page.
Reply Brief, U.S. Appl. No. 09/903,444, filed Feb. 1, 2010, 13 pages.
Seitz, Patrick, "Self-Serve Movie Rental Kiosks a Surprise Hit with Consumers: DVD Vending Machines Find National Audience, Put Pinch on Retailers", Investor's Business Daily, May 31, 2007, 2 pages.
Slania, John T., "Dominick's, Jewel Touting DVD Vending; Rental Kiosks to Feature Per-night Fee on Movies", Crain's Chicago Business, Mar. 19, 2007, 2 pages.
U.S. Appl. No. 11/366,966, filed Mar. 1, 2006, Tomasi.
DVD-Play, Generation-3 Kiosk Flyer, Assumed published by Aug. 18, 2000, based on analysis of Internet Archive WaybackMachine, http://web.archive.org/web/20000818124625/http://www.dvdplay.net/how.asp and http://web.archive.org/web/20000818124432/http://www.dvdplay.net/rentamovie.asp, 3 pages.
Office Action dated Nov. 19, 2007, U.S. Appl. No. 09/578,631, 29 pages.
Appeal Brief, U.S. Appl. No. 09/578,631, filed Jun. 24, 2005, 39 pages.
Office Action dated Mar. 30, 2005, U.S. Appl. No. 09/578,631, 8 pages.
Response to Office Action dated May 8, 2002, U.S. Appl. No. 09/578,631, filed Nov. 6, 2002, 8 pages.

\* cited by examiner

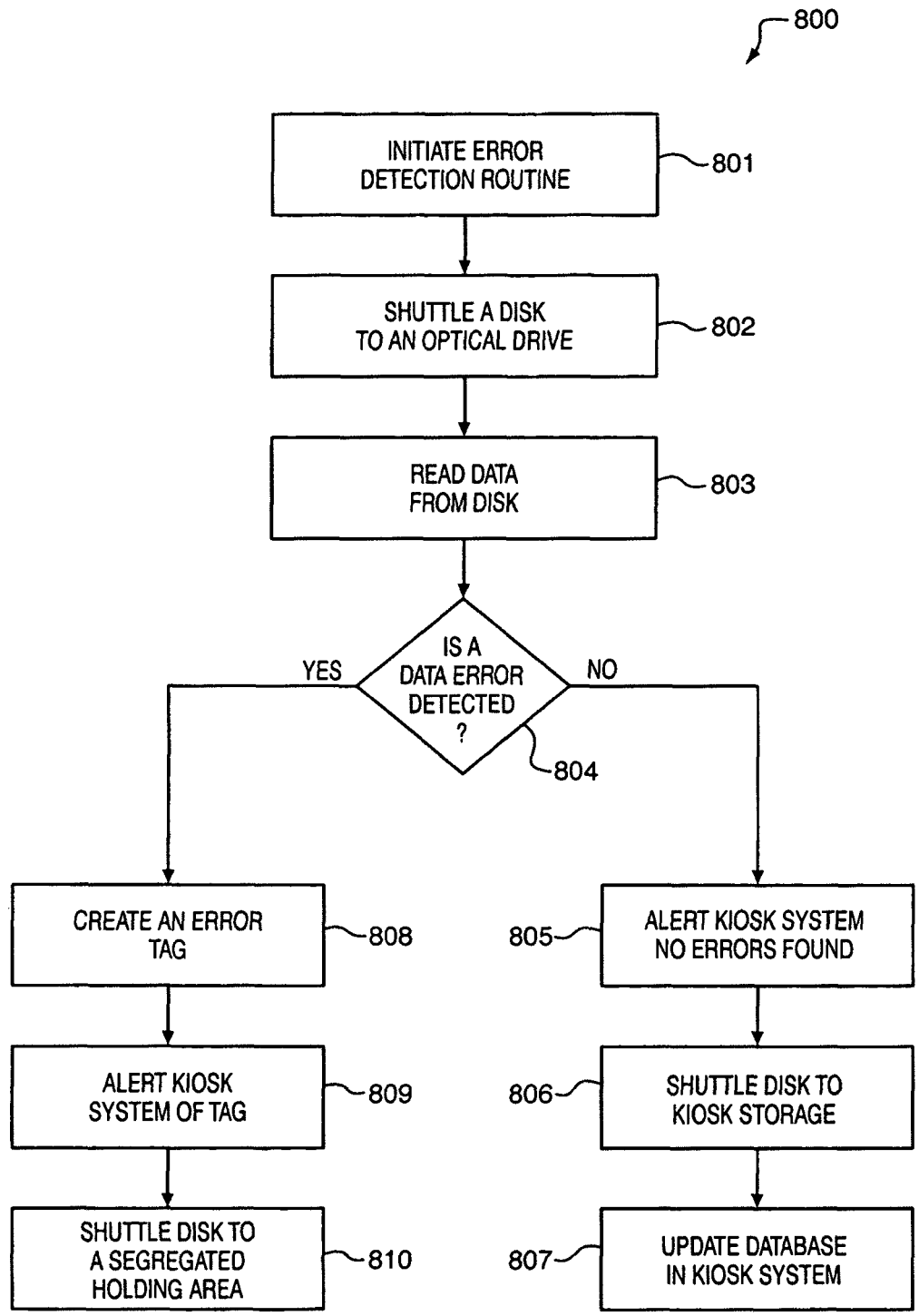

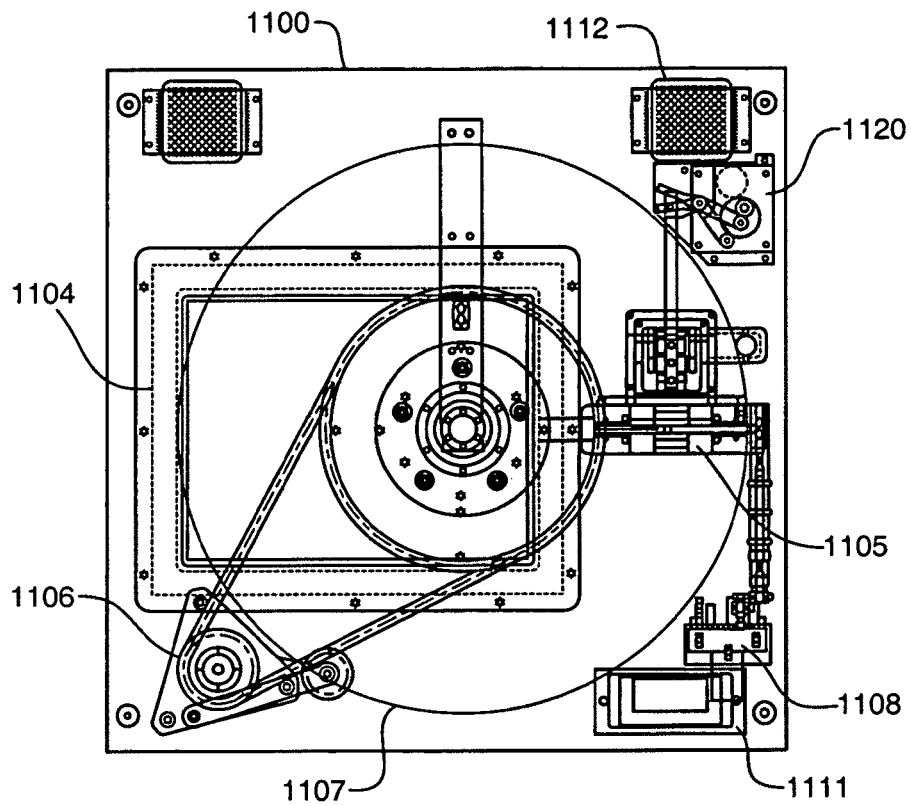
FIG. 11
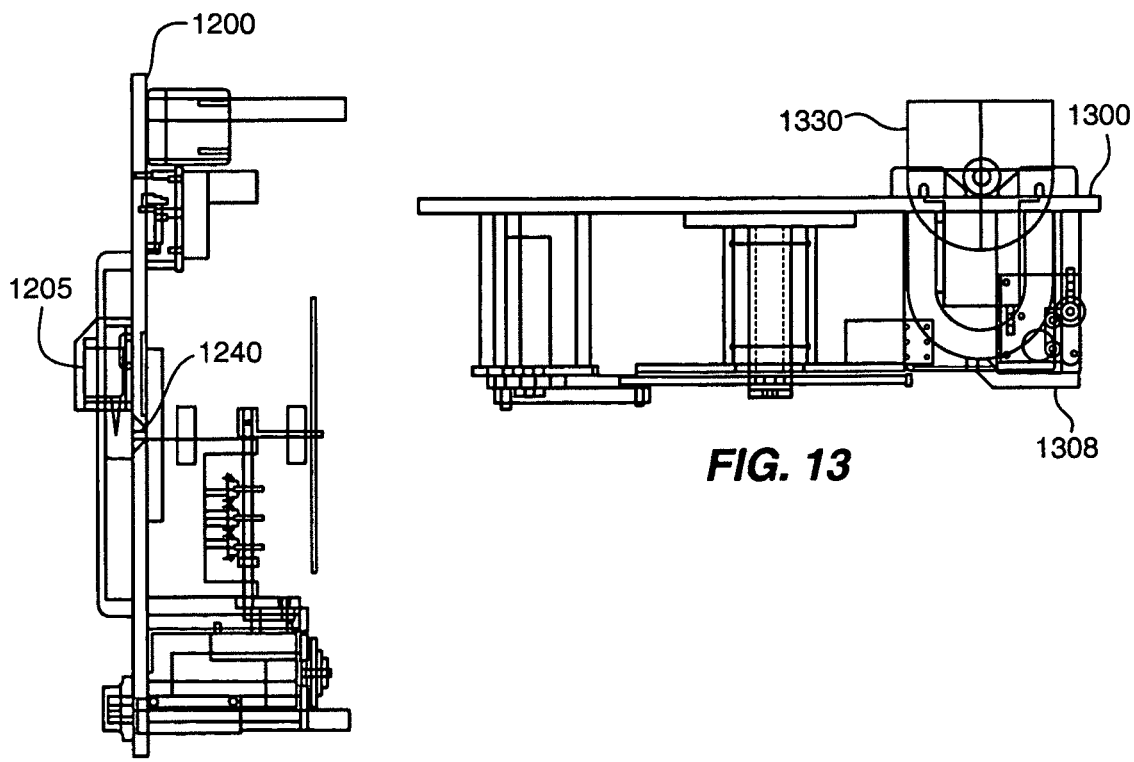
FIG. 12
FIG. 13

DISK DISPENSING AND RETRIEVAL SYSTEM AND ASSOCIATED METHODS

RELATED APPLICATIONS

This application is a continuation of U.S. application Ser. No. 09/578,631 filed May 25, 2000 now U.S. Pat. No. 7,444, 296, which claims priority to U.S. provisional Application Ser. Nos. 60/135,854 filed May 25, 1999, and 60/143,601 filed Jul. 13, 1999, all of which are hereby incorporated by reference.

FIELD OF THE INVENTION

This invention relates to a method and apparatus for dispensing recorded optical disks employing computers and software. More particularly, this invention relates to a method and apparatus for providing automated retail distribution of recorded optical disks. Still more particularly, this invention relates to a method and apparatus for providing a freestanding distribution and retrieval system for recorded optical disks, which is linked to a central server computer using the Internet.

PROBLEM

One method commonly used for distribution of recorded media is a retail outlet. A retail outlet may sell or rent recorded media. A large inventory is common at a retail location, and staff is required for sales, rentals and restocking. A building is required to house inventory and to provide a retail location. A computer system is usually employed to track inventory of rentals and sales. A retail outlet for recorded media is very expensive to construct and operate. Because of these factors, there is considerable overhead required to run a rental or sales business for recorded media.

Another method of media distribution is a limited scale operation. A convenience store might offer a limited selection of items for sale or rent. However, staff is still needed for sales, rentals and restocking. A significant limitation of the retail distribution model for disks is the overhead required to operate a business.

One way that retailers have sought to reduce costs is through electronic commerce (EC). Providing an Internet-connected website for customer interaction is quickly becoming a new business model. A system of distribution using EC can significantly reduce overhead associated with retail locations. In this type of business model a central warehouse or warehouses ship an order submitted via the Internet through the mail or using a private courier. The cost of operating a retail location is avoided with this business model. However, a strictly Internet-based distribution system often has significant liabilities. One disadvantage is that a customer must wait for an order to be shipped from a warehouse location. Another disadvantage is that stock may not be available at the time the order is processed. If stock is unavailable, an order may be placed on back-order or the order may be canceled. Another significant disadvantage of an Internet-based distribution system is the impracticality for media rental. The rental business is one of immediacy; a customer will rent an item that is available immediately, but may not rent if it is not available immediately. A customer is much less likely to rent an item that is shipped after ordering, requiring days for delivery. In addition, once a customer is finished with a rented item it must be return-shipped to the distribution location.

An advantage of an Internet-based distribution, however, is that a customer may set up an account, pay electronically, and provide invaluable information to a retailer, wholesaler or the media industry. What is needed is an Internet-based distribution system that allows a customer instant distribution or retrieval of media that does not require a retail outlet with the attendant staff and other costs of doing business. In addition, there is a need to provide automated services for payment and quality assurance such that a distribution system is simple and inexpensive to construct and maintain.

SOLUTION

The above and other problems are solved and an advance in the art is made by provision of a method and product for Internet-based automated distribution and collection of recorded disks.

A first advantage of the invention is the ability to provide automated distribution of recorded disks. A standalone fully automated kiosk serves as a distribution point for an integrated system of automated distribution linked via the Internet. The kiosk is a simple and inexpensive mechanical system providing storage and dispensing of disks. A carousel or shuttle system provides access to multiple media selections within the kiosk. Multiple kiosks may be connected to the system via the Internet for simultaneous use by users at different locations.

A user interacts with the system via a touch screen. The system software guides each customer through the process using HTML linked pages connected to a database. A selection is entered on the touch screen to choose one or more items for rental or sale. The selections are added to a "shopping cart," or a temporary database represented on the display, that is approved by the customer. A credit or debit card or other membership information may be entered using a magnetic strip card reader or other device that imports the data to a verification module. Approval or denial of credit is accomplished via a local database, and/or a connection to the system central server computer, and/or a connection to banking services. If the credit or debit is approved, the ongoing transaction is attached to a customer, approval for the price of the disk is entered, and a dispensing system is activated. A database then queries software for the requested item location. A carousel or shuttle system manipulates the media until it is aligned with the dispensing/retrieving slot. A door mechanism is activated to open, and a mechanism is activated to push the recorded disk partially out of the slot to make it available for hand retrieval by the customer.

A second advantage of the present invention is the ability to reduce expense by emailing transaction information to a customer. During the disk dispensing operation, an option to receive an e-mailed receipt is given. The option contains a touch-screen keyboard pop-up for the purpose of entering email address characters and other data. A consumer enters an email address via the touch screen keyboard. Receipts may include transactional information as well as advertising and links to specific web-sites. All receipts are given by e-mail reducing the expense of a kiosk since a hard-copy receipt printer is not required. Additionally, the system acquires e-mail addresses from customers allowing post transaction interaction while the consumer is on online.

A third advantage of the present invention is the ability to receive media back to the system. The customer activates a return process by selecting "Return" from a touch screen menu or by presenting the disk to the system bar-code reader or optical sensor. The carousel or shuttle system positions to accept a disk at the opening. An initial sensor detects if the recorded disk belongs to the system and activates a door mechanism to allow placement of the recorded disk in the opening. If the recorded disk does not register as a system disk, the door mechanism will not allow the disk to enter the opening. Once registered, the individual code associated with each item is entered into the database and the position in the carousel or shuttle is stored. An open transaction is closed when the item is returned and logged in the database or sold. The location of each item is stored in the database upon insertion through the return slot. Recorded disks are stored raw or in containers specific to the system. This may include certain lock and key structures on the system and on the containers that enable early identification of the item. Item-specific identifiers may be present on the container, on the item, or on both to further verify the identity of the individual items.

A fourth advantage of the present invention is an error detection system. Quality scanning software can accomplish a playable/not playable decision via interaction with the error correction code on individual optical media. Product to be dispensed can be assured of quality after an automated analysis. The scanning may be performed using a media specific drive, in concert with automated transporting to and from the drive within the storage system. The error system first identifies every file in the file tree structure. It then traps errors in the file tree structure if a file cannot be opened. Next, the error system opens each file, reads the first block of each file, reads subsequent blocks of each file, trapping errors on each block. The block size is adjustable, the number of blocks read is adjustable and the number of blocks skipped is adjustable. The error system stores block data in a database. The error system totals successful and unsuccessful block reads. The error testing system allows an algorithm to determine the integrity of the media, and to generate disk imperfection data toward tracking the degradation of disk quality over successive rentals.

The error-testing algorithm runs on readily available personal computer hardware. Once an error is found, the system determines a number of contiguous blocks affected. Based on the number of bad blocks and the number of contiguous bad blocks, the system determines a probable level of media integrity on a multi-point scale. The system then compares the file tree found and errors found against test results for perfect disk and previous test results for the same disk. If a "bad media identifier" is indicated, the "bad media" tag is associated with the database entry, the disk is not made available for re-rental or sale and notification is made at the central server that the disk is available for removal. A mechanism is preferably incorporated into system media cases that when toggled allows the system to identify a disk that the customer deemed to be damaged or in need of attention. Additionally, an attached or stand-alone polishing system that has payment elements common to the invention system can take a disk, resurface the read side, and return the disk. This may include a grinding system and/or a buffing system and may be Internet connected, or linked to the system kiosk.

A fifth advantage of the present invention is the ability to provide on-demand publishing for automated distribution. The system will be linked to a central server computer for the transfer of data in multiple directions. Multiple individual systems can be linked via a network, and data may be transferred to a kiosk site or group of sites, recorded on disk and distributed for rental or sale in an automated process.

A sixth advantage of the present invention is a circular bar code for the purpose of identifying disks inserted into the kiosk system from any orientation. The "ringcode" consists of concentric circles separated in dark and light bands with relative distances recognized by standard line scanners.

The ringcodes are created by reducing a standard barcode to a single point width cross-section. This produces a single straight line of dots that are spaced to the original barcode. The line is then pivoted around a prescribed center radius to produce a group of concentric circles spaced to the original barcode. A standard line scanner will view a simple straight cross-section as it passes through the center of the ring. This gives the scanner two attempts at reading the entire code on the coded object; once on either side of the center as the reader passes over the center of the code.

A seventh advantage of the present invention is the universal kiosk element of the system. The kiosk system may be shipped via standard shipping methods such as UPS. This capability, in combination with Hot-Swappable Kiosks, and low cost manufacturing allows rapid Remove and Replace (R&R) maintenance as needed. Additional units can be stocked on site specifically for maintenance and replacement or can be shipped quickly to provide locations with optimal ongoing performance.

The kiosk may be designed to utilize a quick-mount wall frame system. This capability addresses the maintenance of public use terminals, allowing anyone with keyed access to remove the system from the wall mount bracket for repair or replacement. This reduces maintenance costs by speeding installation and provides plug-and-play instant connectivity requiring no special tools, training or connections. Additionally, the kiosk system is totally portable, and can be mounted by one person on a wall or in a wall. Wireless devices that allow connection to the Internet without phone or data lines present will allow interactive kiosk units to be placed in unwired locations.

An eighth advantage of the present invention is automatic restocking of the kiosk system. Customers return the media to the system. A single-touch selection or bar-code-activated initiation of the system starts the process. The kiosk system then rotates the carousel into the appropriate alignment of the opening to the selected inventory slot. Once in the appropriate alignment, and upon recognition of the system-specific barcode, the door opens for acceptance of a cased recorded disk. As the case passes through, the door mechanism pivots to decline additional insertions until the system is ready. The location information is stored in the computer, restocking information is downloaded to the central server and the disk is then available for subsequent rental or sale.

BRIEF DESCRIPTION OF THE DRAWINGS

FIG. 8 a flowchart of an error detection process for recorded disks;

FIG. 11 is an exemplary front-view of a second preferred embodiment of a kiosk;

FIG. 12 is an exemplary side-view of the kiosk of FIG. 11;

FIG. 13 is an exemplary top-view of the kiosk of FIGS. 11 and 12;

DETAILED DESCRIPTION OF THE INVENTION

Figure 1:
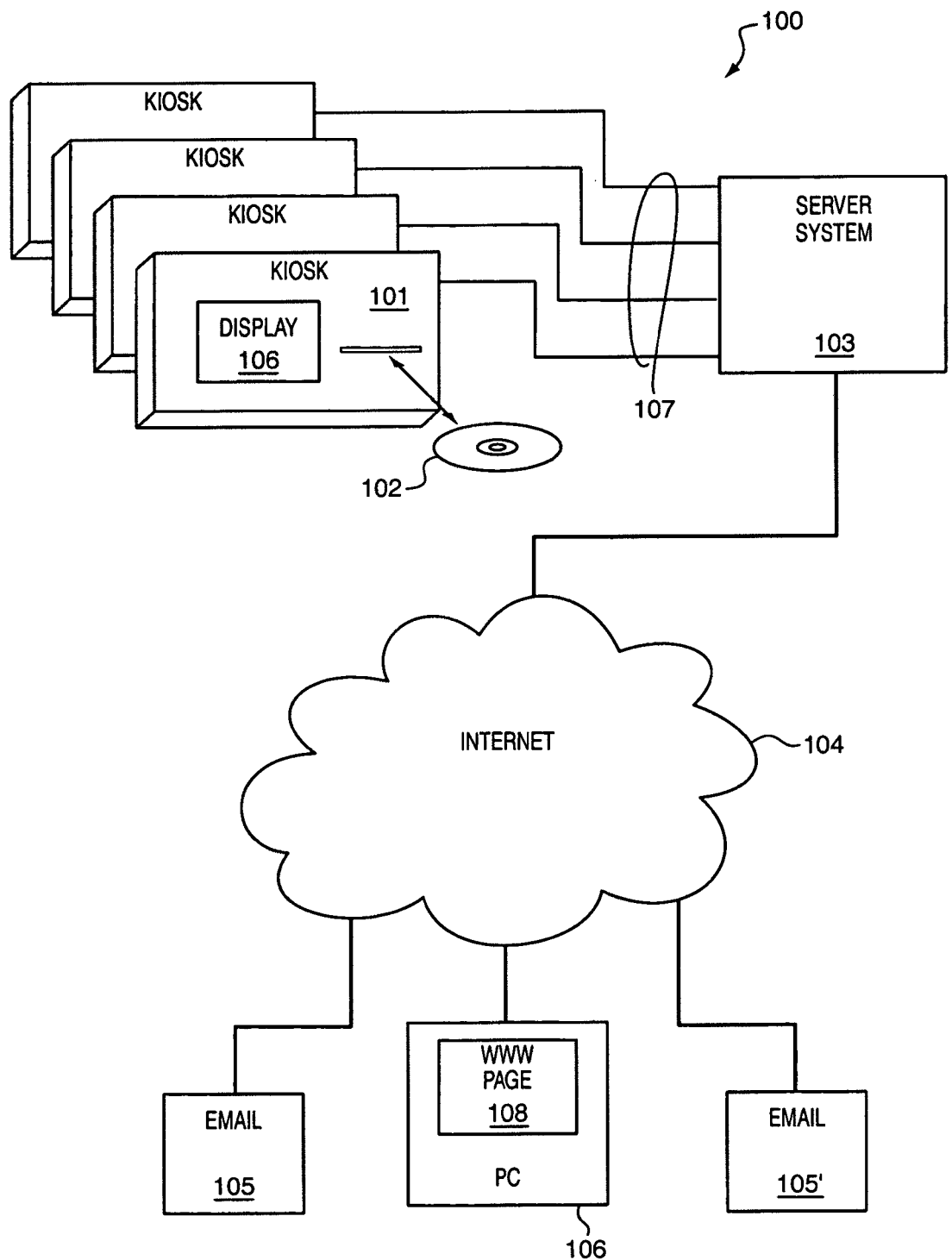
FIG. 1 illustrates the disk distribution system of the invention.

In the following detailed description of the present invention, a method and product for Internet-based automated disk distribution and retrieval, specific details are set forth in order to provide a thorough understanding of the present invention. It will be obvious, however, to a person skilled in the art that the present invention may be practiced without these specific details.

System Overview

The integrated disk distribution system is centered on combining instant physical access to recorded disk media with the convenience of Internet based e-commerce. The system is designed to support Digital Versatile Disk (DVD) players, and other optically recorded disk systems.

An Internet-connected central server computer integrates customers, suppliers, employees, kiosks, owners, and the video industry in a "Hub and Spoke" system that is fully automated and interactive, providing real time business-to-consumer and business-to-business capabilities.

The system kiosks are a critical piece of the Hub and Spoke network system. For the purpose of the following discussion "kiosk" may be used interchangeably with Automated Dispensing or Retrieval System (ADRS). The kiosks act as the brick and mortar spokes, providing a faster, more convenient way for customers to obtain and return DVD videos or other disks. Each kiosk is a self-service unit that combines mechanical dispensing systems, Internet connectabilty and a touch screen monitor for customer interaction. The compact nature of the DVD format allows up to 1000 disks to be stocked in a kiosk like the system shown in FIG. 9. The kiosk's small space requirement allows placement in high-traffic locations that are more convenient than traditional retail locations. Internet connectivity allows customers to have the choice of shopping online or on-site or to access a variety of real-time services. Additionally, smaller low-cost units holding fewer disks, but with the same interactive capabilities allow placement in a multitude of convenience-based locations in both floor mount and wall mount configurations. The kiosks present significant reductions in labor and real estate costs compared to traditional video rental outlets.

Each kiosk is a self-service unit that uses a computer, Internet connectivity, and a touch screen monitor for customer interaction. The small physical footprint of the kiosk enables it to be placed in a variety of locations. The kiosks can operate 24 hours a day, 7 days a week, providing instant electronic access to products. The kiosks are fully automated providing customer service through the Internet; and on-site staffing is not required to support customer needs. The system web site provides 24-hour access to on-line customer support. It also provides access to specific kiosk inventory, movie trailers and reviews, customer inquiries, special orders, regular individually tailored e-mailed updates, and overall service. The integrated remote kiosk monitoring system allows low cost inventory management, tailored marketing promotions, operations planning, and system diagnosis.

In the preferred embodiment, the kiosks are physically designed to meet American Disabilities Act (ADA) specifications so that they may be placed in public facilities. The kiosks also preferably meet other regulatory requirements of public transportation facilities, universities, and office buildings.

The system central server supports a World Wide Web site. The central server includes promotional drivers and accessory services that route through the system website in conjunction with the kiosks. Customers may use the Internet to query a specific kiosk for availability or to purchase new and used media, register for e-mailed updates, or participate in various targeted programs.

The integrated system allows fast transactions. A simple and easy to use title search process minimizes shopping time and allows rapid transactions. Transaction times from walk-up to walk-away can be less than 60 seconds and average 2.5 minutes. Return of media is also simple, as the disks only need to be re-inserted into the dispensing/retrieval mechanism. Upon the return of a disk at a kiosk, the internal computer reads individual identification information from the disk and restocks it automatically.

The system uses standardized components. The standard design of the kiosk components minimizes manufacturing costs and simplifies maintenance. Standardized automated kiosks allow placement of the system kiosks in non-customary locations providing the appropriate service to the target customer and ease of maintenance.

The system allows remote price changes and can also gather up-to-the minute product availability and customer data. Thin-client computing technology keeps hardware costs low and speeds up application deployment by centralizing management, and enhancing security. E-mailed receipts generated from the kiosks through the central server allow ongoing access to customers after the completion of the transaction.

Recorded disk pricing may be determined on a kiosk-by-kiosk basis based on local market conditions. Pricing also varies depending on market elasticity; for example, premiums may be placed on DVD videos available in airport terminals. Differentiated pricing can be used for newer releases vs. older releases. In addition, rental terms and promotions may vary based on kiosk locations and the time of week, and can be adjusted remotely on demand.

Operational Overview

At the kiosk, a graphical user interface (GUI) utilizing a touch screen display provides a user-friendly interface even to consumers lacking computer experience. Once a touch screen is activated, a computer in the kiosk generates a touch-selectable list of available media: movie genres such as Action, Drama, Romance, and Comedy, for example. By touching on one of the genres, a selection of associated titles and/or a promotional picture may appear on the screen. Touching an image causes basic information to be displayed about that media such as cost and rating, along with an option to rent or purchase the media. When selection of media is complete, a credit, debit card, or other membership ID is requested to execute the transaction and then the disk is dispensed to a customer.

Return of rental media is similar; a customer may select "Return" on a touch screen, and then insert a disk into an opening in the kiosk. An optical scanner first verifies that the disk belongs to the system before accepting a disk. Upon return, a disk may be evaluated for damage by a media diagnostic system. Damaged rental stock, scratched or warped disks for example, are identified and quarantined. This provides a means to track inventory quality and when and who damaged a disk. Depending on the extent of the damage a customer may be assessed a fee.

Internet connectivity and a dynamic customer database provide product promotion capabilities and consumer access. Product information and promotions may be tailored to each location's demographics and additionally to each kiosk's rental and sell-through history. Advertising is available on a kiosk screen and on associated monitors such as overhead plasma displays. Advertising on the kiosk screen provides a mechanism to promote specific marketing initiatives as well as additional local and global advertising. A loyalty program encourages and rewards repeat customers by offering special discounts or services while conducting transactions. The system website allows consumers to search for kiosks and to query a specific kiosk for available content. The website also carries updated lists of used media for sale at discounted prices at individual kiosks. A customer may reserve and pay for a DVD stocked at a specific kiosk from the website, then pick up the DVD within a specified time period at the specific kiosk. Once a customer enters e-mail information at the kiosk or at the website, that customer is eligible to receive frequent tailored e-mailed updates from the central server on current promotions.

Additional products potentially distributed through the kiosks include a variety of other disk-based media such as books on disk, DVD music videos, DVD-ROM, DVD video games, DVD-Audio, SA-CDs and CDs. The modularity of the system allows for easy adoption of additional disk-based content distribution.

Detailed Description of System Elements

Some portions of the following detailed description are presented in terms of procedures, logic blocks, processing steps, computer program code and other symbolic representations of data operations within a computer memory. A procedure, logic block, process, etc., is a self-consistent sequence of steps or instructions leading to a desired result. The steps are those requiring physical manipulations of physical quantities.

A practitioner will recognize that all of these and similar terms are to be associated with the appropriate physical quantities and are merely convenient labels applied to these quantities. Unless specifically stated, terms such as "processing," "computing," "calculating," "determining," "displaying," refer to the action and processes of a computer system or similar electronic computing device.

Figure 6:
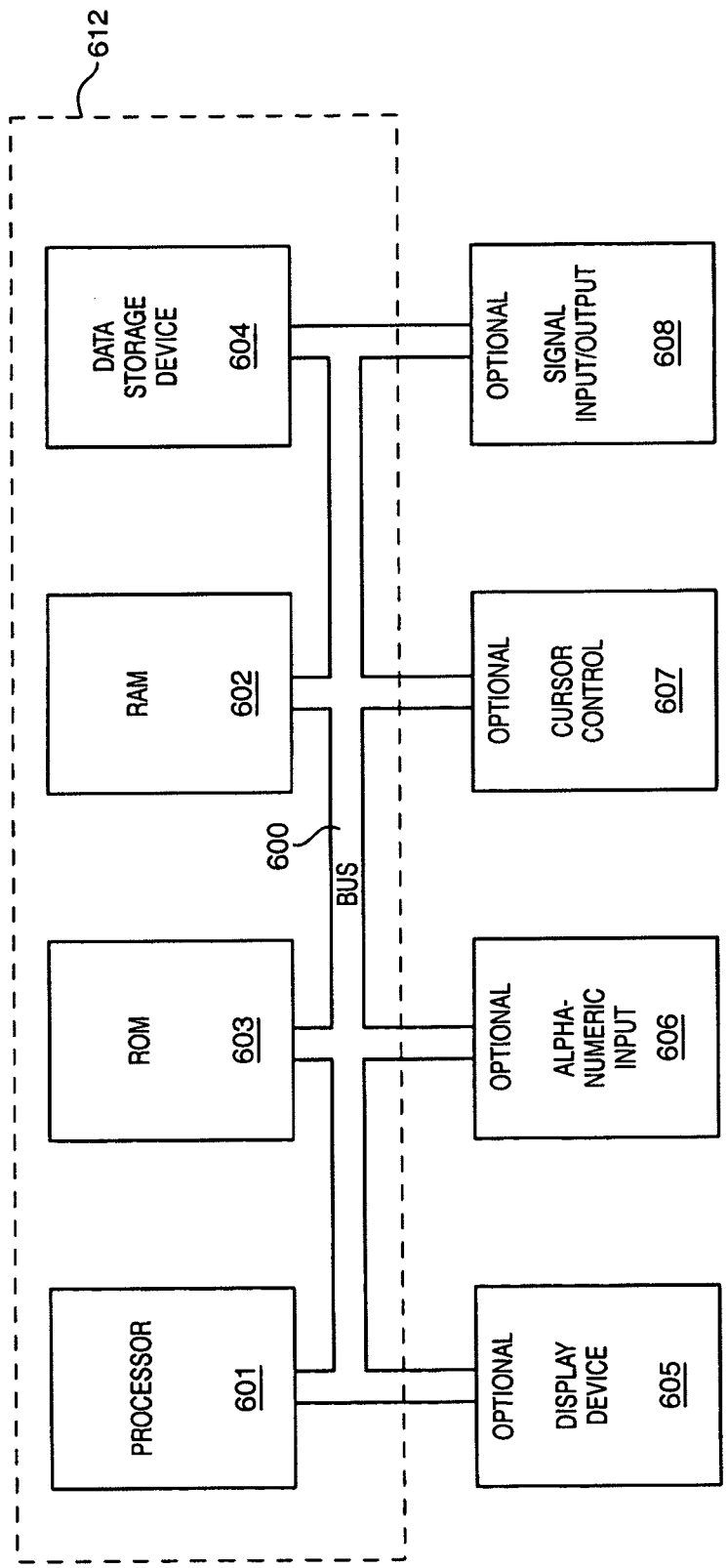
FIG. 6 is a block diagram of an exemplary computer system.

FIG. 6 illustrates a computer system 612. In general, computer system 612 used by the preferred embodiment of the present invention comprises a bus system 600 for communicating information between system components. A central processing unit 601 for processing information and instructions is coupled to bus system 600. A processing unit may be a processor a microprocessor or any group or combination of processors or microprocessors. A random-access memory 602 for storing information and instructions for the central processor 601 is coupled to bus system 600. A read-only memory 603 for storing static information and instructions for the processor 601 is coupled to bus system 600. A data storage device 604, such as a magnetic or other disk drive, for storing information and instructions is coupled to bus system 600. A display device 605 for displaying information to the computer user is coupled to bus system 600. An alphanumeric input device 606, including alphanumeric and function keys, for communicating information and command selections to the central processor 601, is coupled to bus system 600. A cursor control device 607 for communicating user input information and command selections to the central processor 601 is coupled to bus system 600. And, a signal-generating device 608 for communicating data or signals between devices external to system 612 and processor 601 is coupled to bus system 600.

The display device 605 of FIG. 6 utilized with computer system 612 is suitable for displaying graphic images and alphanumeric characters. A cursor control device 607 is known in the art to include a trackball, mouse, joystick, or special keys on an alphanumeric input device 606. A cursor control device 607 inputs cursor movement of a given direction or manner of displacement. The cursor control device 607 also may be directed and/or activated via input from the keyboard using special keys and key sequence commands. Alternatively, the cursor may be directed and/or activated via input from a number of specially adapted cursor directing devices or may be integrated with a display device 605.

FIG. 1 illustrates a preferred embodiment of an optical disk distribution system 100. Generally, system 100 distributes recorded optical media in disk form; for example a Digital Versatile Disk (DVD), or a Compact Disc (CD). A disk, recorded disk, or recorded optical media are hereafter used to refer to a recorded optical disk media. The system 100 integrates one or more kiosks 101 with a server system 103 through a virtual network 107. The server system 103 is connected to the Internet 104 for direct linking to individual email accounts 105 and 105'. The server system 103 supports a World Wide Web page set 108 for general access by customers using the Internet. Generally, access to system web page set 108 supported by server 103 is through an Internet Service Provider (ISP) that provides an Internet connection for a personal computer 106. The kiosk 101 has a display 106 for viewing and entering information. The kiosk 101 dispenses and receives disks 102, via an opening on the front.

Figure 2:
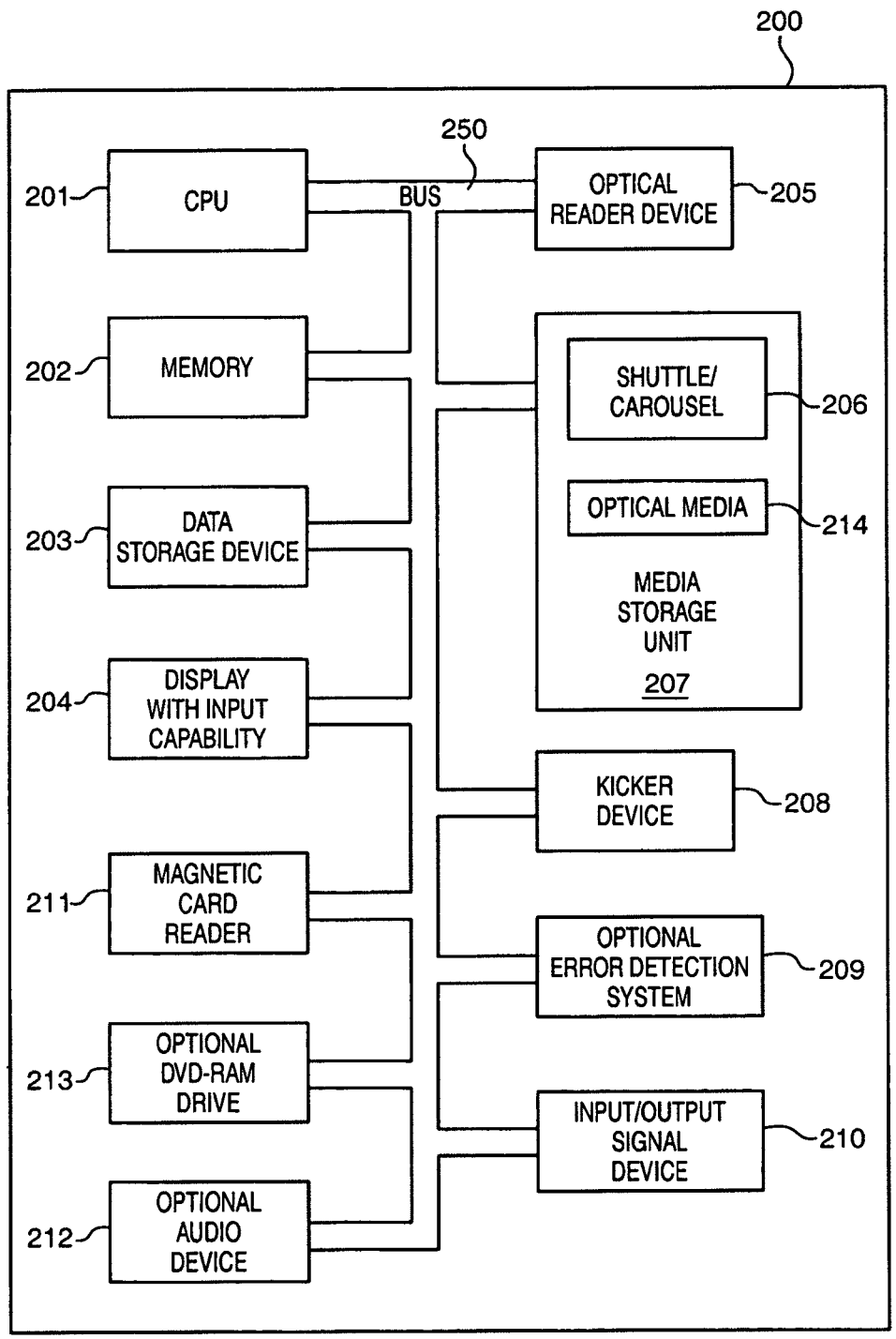
FIG. 2 is a block diagram of a system kiosk.

FIG. 2 illustrates a preferred embodiment of a system kiosk 200. The system kiosk 200 is a self-contained unit dispensing system that contains computer devices and mechanical devices. A central processing unit 201 is operably connected to a system bus 250. System bus 250 may be a single bus or a series of busses for communicating data or signals between various devices and central processing unit 201. A memory device for storing instructions 202 is operably connected to system bus 250. A data storage device for storing data, or containing databases and/or other instructions, is connected to system bus 250. A display device having alphanumeric input capability 204 is operably connected to system bus 250. Alternatively, system kiosk 200 may contain computer system 612 for controlling system functions. If computer system 612 is contained in system kiosk 200, then bus 600 is operably connected to or replaces system bus 250. A magnetic card reader 211 for reading magnetically imprinted cards is operably connected to system bus 250. Any device suitable for uniquely identifying a customer such as a retinal scanning device, a smart-card reader or finger-print scanner for example, may be substituted for magnetic card reader 211 when appropriate. An optical reader for reading bar-type codes 205 is operably connected to system bus 250. A disk shuttle assembly for accessing and storing disk media 206 is operably connected to system bus 250. A media storage unit 207 for storing optical media 214 is contained in kiosk 200. Shuttle system 206 may be contained in, or integrated with, media storage unit 207 for accessing optical media 214. A kicker device 208 for dispensing or receiving optical disk media 214 is operably connected to system bus 250. An optional audio device 212 for providing kiosk sound capability may be connected to system bus 250. An optional DVD- Ram or DVD-ROM drive 214 for reading data from, or writing data to, optical media may be operably connected to system bus 250.

An optional error detection system 209 for detecting damaged optical disc media may be internal to or external to system kiosk 200. When error detection system 209 is internal to system kiosk 200, error detection system 209 is operably connected to system bus 250, and DVD-RAM or DVD-ROM drive 213 is operably connected to system bus 250.

In a preferred embodiment of the invention a system for polishing damaged optical media may be internal to kiosk 200 or may be a linked freestanding unit external to kiosk 200 but preferably shares power and functionality. If a polishing system is provided with a kiosk 200, shuttle 206 may be used to move optical media to or from kiosk 200. In a preferred embodiment kiosk processor 201 may be utilized to control functions of a polishing mechanism. A polishing system for optical media is known in the art and is not depicted in FIG. 2.

Figure 3:
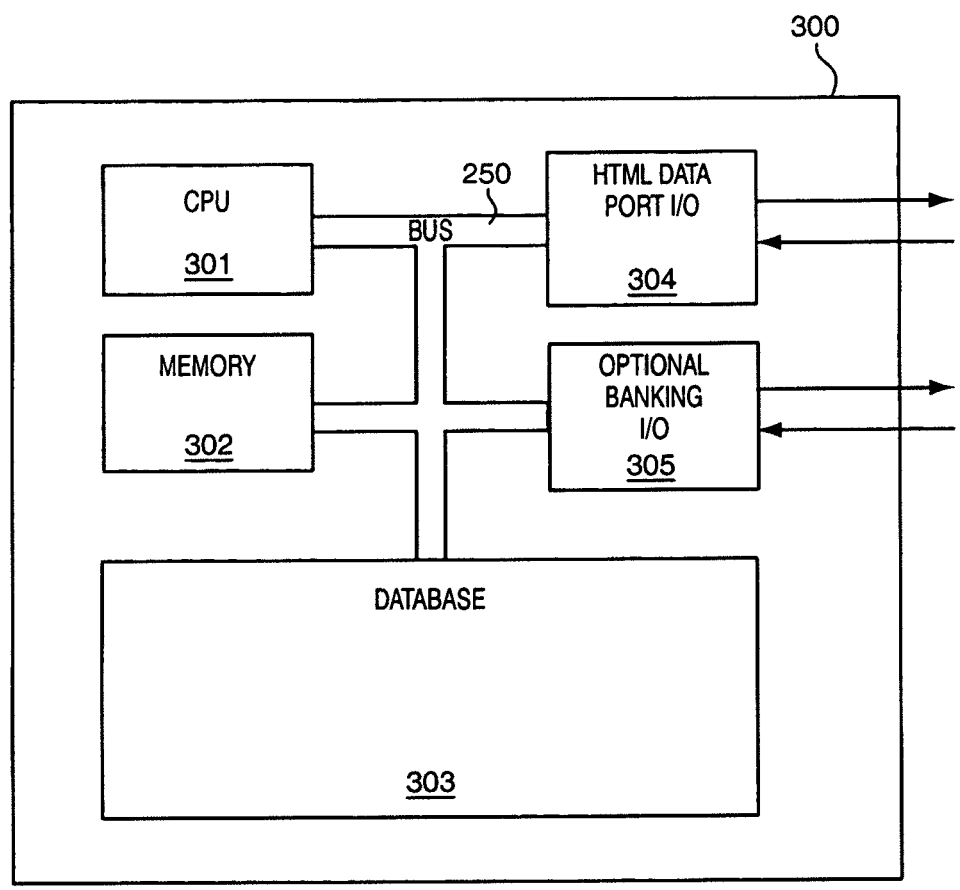
FIG. 3 illustrates a system central server computer.

FIG. 3 is an illustration of a preferred embodiment of a central server computer 300. The system central server computer 300 may also be computer system 612. System server 300 provides command and control and collects and delivers data to system kiosk 200. Server computer 300 has a central processing unit 301 that is operably connected to server system bus 350. A memory device capable of storing instructions 302 is operably connected to server system bus 350. A database 303 for storing data is operably connected to system bus 350. A communication device capable of transmitting and receiving data or html 304 is operably connected to system server bus 350. An optional second communication device for exchanging data for commercial transactions 305 may be operably connected to server system bus 350.

Figure 4:
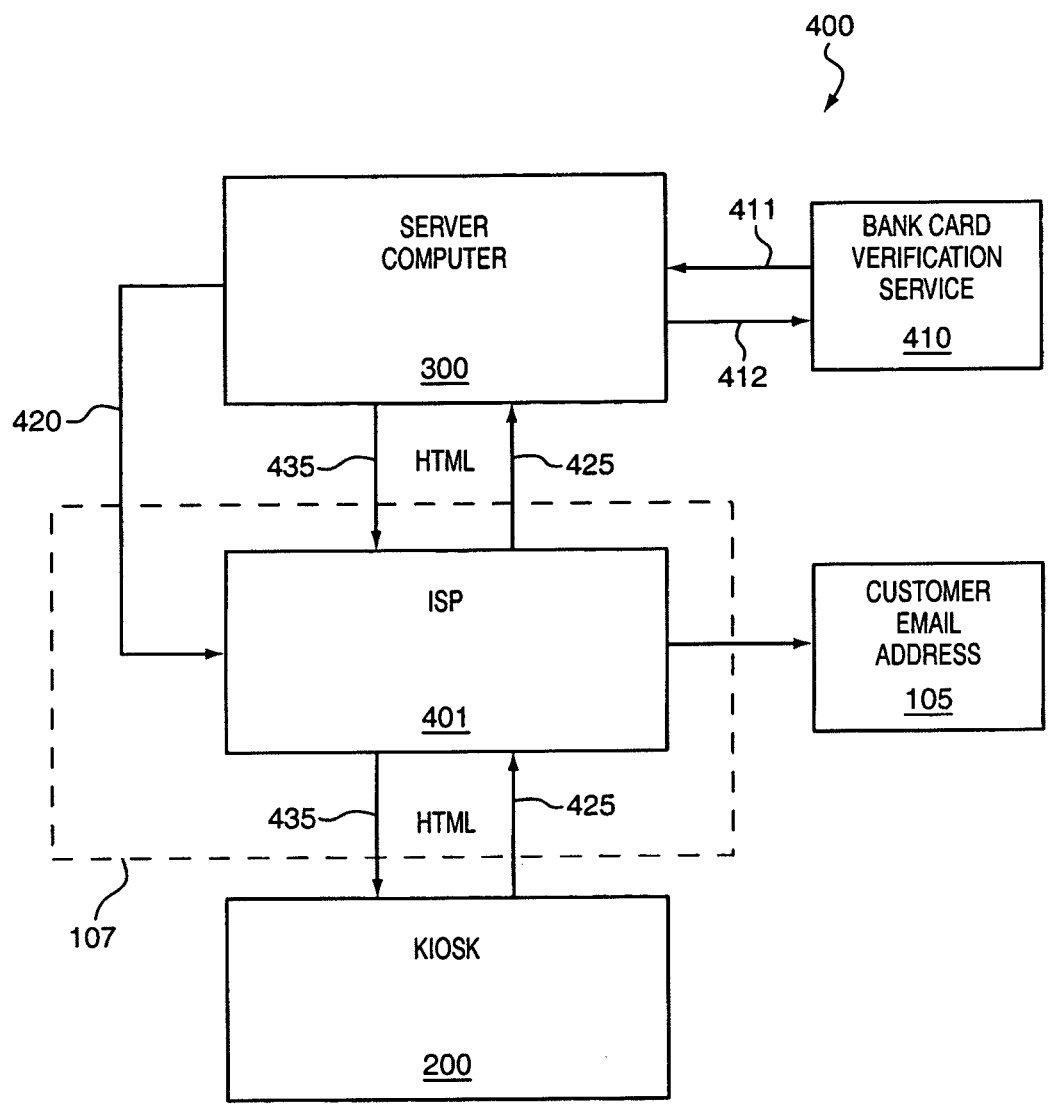
FIG. 4 is a block diagram data exchange within the distribution system.

FIG. 4 depicts a preferred embodiment of the system data transfer mechanism 400. Mechanism 400 is, for example, item 107 of FIG. 1. A virtual network connection, item 107 FIG. 1, provides data exchange between a kiosk 200 of FIG. 2, and server computer 300 of FIG. 3. The kiosk-server virtual network system 107 can be a local network system or a remote network system that may utilize an html-based data exchange, e.g. an intranet or extranet. The exchange of data in html format includes an html request 425 and an html page 435. Both the kiosk 200 of FIG. 2, and the server computer 300 of FIG. 3, may request and receive data using the html protocol, allowing a two-way data-exchange system. The use of the html protocol allows an Internet browser to be a system interface, and additionally allows the system to be administered by an Application Service Provider (ASP) using the Internet. Application Service Providers (ASP) provide software applications across the Internet by basing resident software on a central server that is accessed using an Internet browser. The use of ASP's is desirable where the functionality of a network is desired, but the use of a private server-system is impossible or impractical. An Internet Service Provider (ISP) 401 may also be an ASP. An ISP provides a connection to the Internet to individual computer users.

Exchange of data using virtual network 107 of FIG. 1, is accomplished in a secure manner using methods of data encryption and decryption known in the art. Secure transfer of data through an ISP provides a virtual private network connection. An additional data exchange may occur on a dedicated private network connection for banking services, or alternatively using a virtual network as in item 107 of FIG. 1. Server 300 of FIG. 3 may obtain credit or debit or other membership authorization using information received from a customer. A credit authorization request 412 is transmitted from server 300 of FIG. 3, to a bankcard verification service 410, which generally is a secure server computer. After receiving credit authorization request 412, bank-card verification service 410 processes credit authorization request 412, and transmits a response 411 to server computer 300 of FIG. 3. Response 411 is conveyed to kiosk 200 of FIG. 2 through virtual network 107 of FIG. 1.

Figure 5:
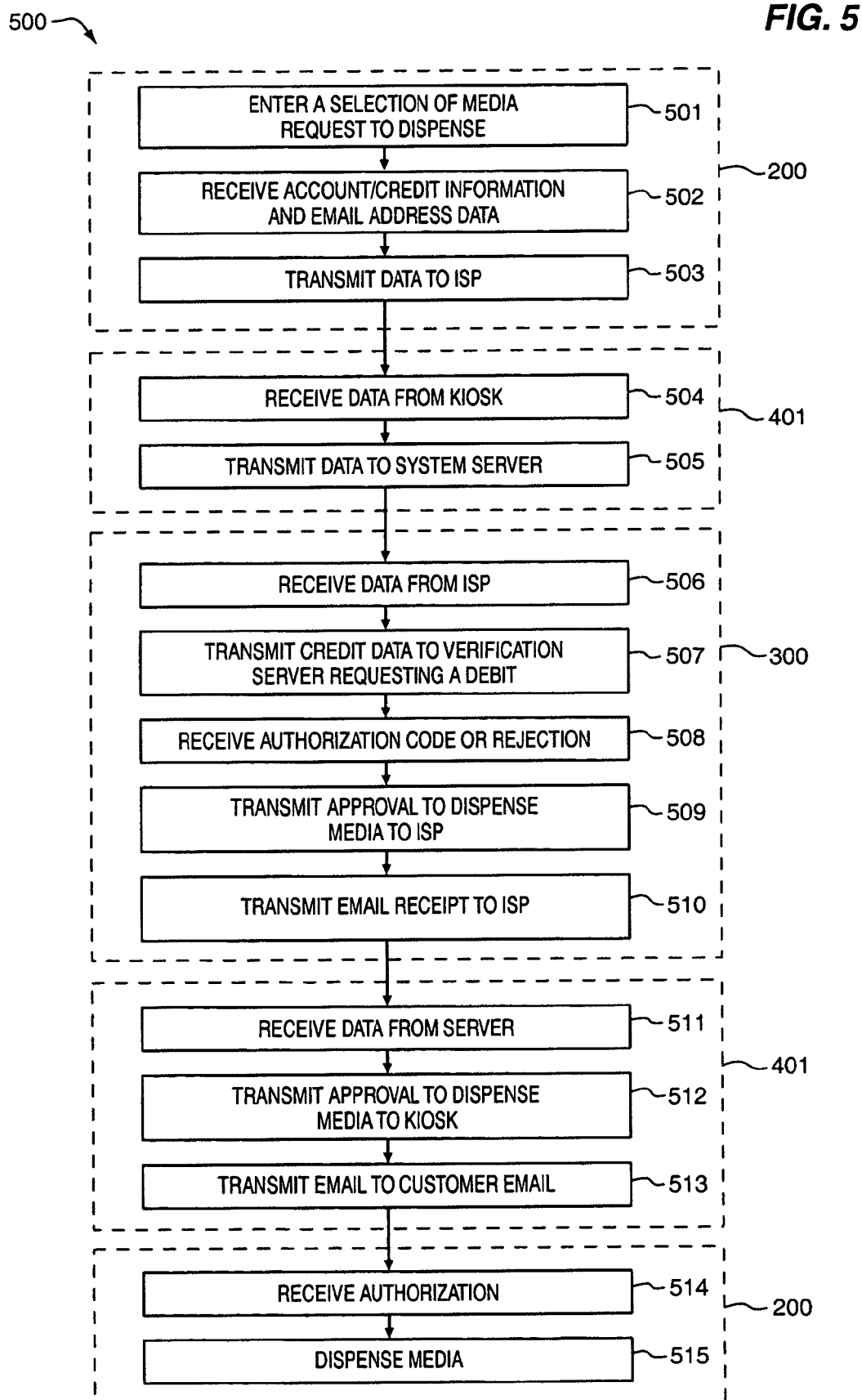
FIG. 5 is a flowchart of a system transaction.

FIG. 5 illustrates a preferred embodiment of a disk dispensing transaction process 500. Process 500 begins with a request to dispense a media selection from kiosk 200 of FIG. 2, in step 501. Information including, for example, credit card number or email address is next received from a customer to kiosk 200 in step 502. Kiosk 200 then securely transmits data received in step 502 to ISP 401 of FIG. 4, in step 503. Data securely transmitted in step 503 is received to ISP 401 in step 504. Data received to ISP 401 in step 504 is securely transmitted to system server 300 of FIG. 3, in step 505. Data securely transmitted to system server 300 in step 505 in next received to system server 300 in step 506. System server 300 next securely transmits debit authorization request data to a credit verification server in step 507. System server 300 next securely receives credit authorization data from a credit verification service in step 508. System server 300 next securely transmits authorization data received in step 508 to ISP 401 in step 509. In step 510 system server 300 transmits to ISP 401 an e-mail receipt for a debit transaction occurring in steps 507 and 508 for an e-mail address supplied in step 502. In step 511 data transmitted by system server 300 in step 509 and step 510 is received by ISP 401. Step 509 and step 510 may occur simultaneously in one step or sequentially in different steps. In step 512 ISP 401 securely transmits to kiosk 200 authorization to dispense requested media received from system server 300 in step 511. In step 513 ISP 401 transmits email receipt data received from system server 300 in step 511 to an email address received in step 501. In step 514 kiosk 200 securely receives authorization to dispense media transmitted from ISP 401 in step 512. In step 515 kiosk 200 dispenses requested media to a customer.

Figure 7:
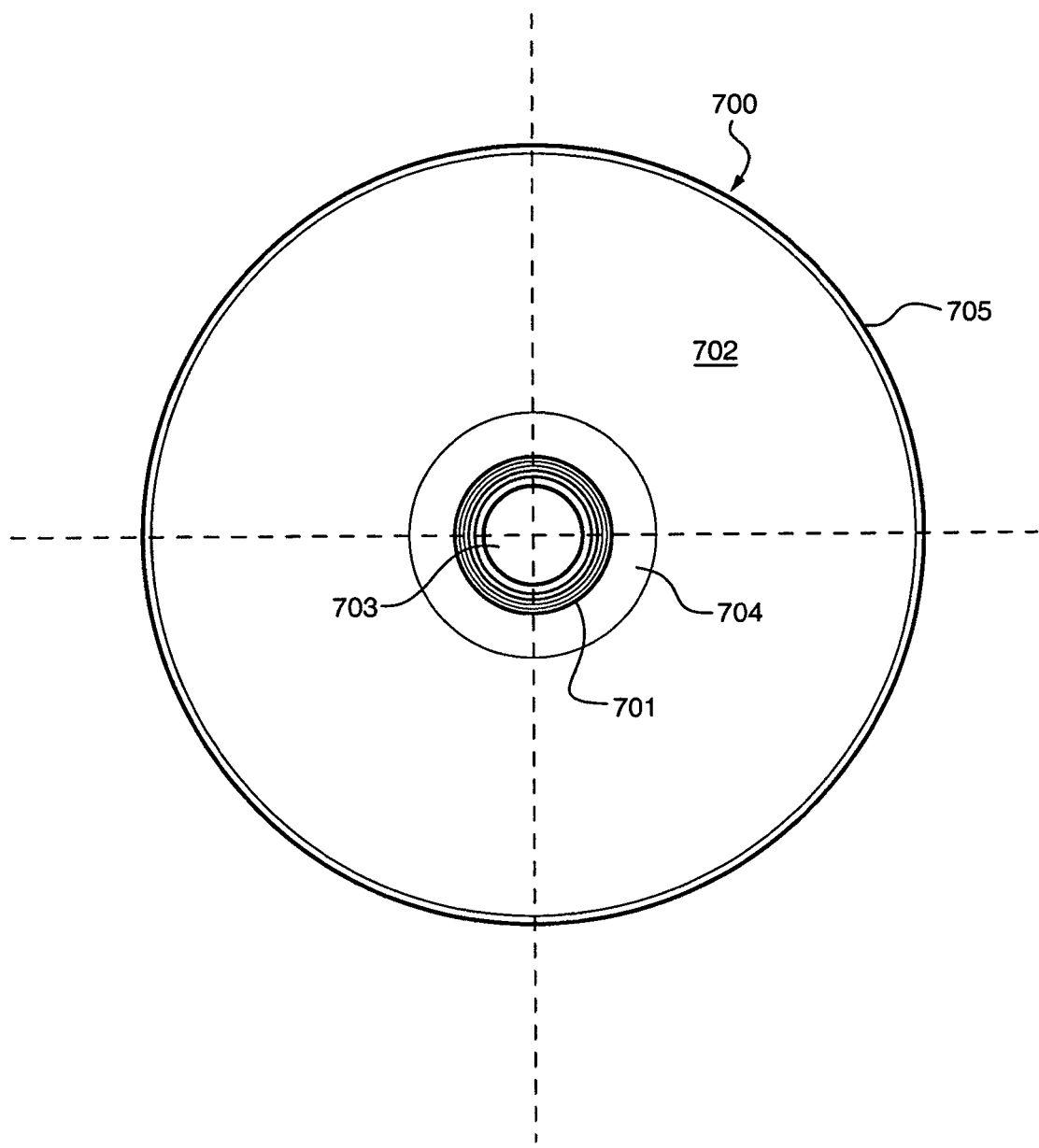
FIG. 7 is a depiction of a ringcode for recorded disks.

In a preferred embodiment of the invention, shown in FIG. 7, an optical ringcode 701 uniquely identifies each recorded disk 700. Generally an optical disk is comprised of a sandwich of polycarbonate and a reflective surface. A region between the media outside diameter 705, and the center region 704 may be used for a label region 702. On a single-sided media the label region 702 which is positioned upon the reflective surface may contain printed information. On a dual-sided media nothing may be printed in the label region 702. A center region 704 exists between the label region 702 and the center hole 703. The center region 704 may contain printed information on both single-sided and double-sided optical media. A standard barcode system has been established and is known in the art. For recorded disk 700 a radial optical code 701 is achieved by rotating a section of a standard barcode around a fixed position located at disk 700's true center. The resulting "ringcode" 701 is a series of concentric circles that may be scanned from any radial position of the disk 700. In the preferred embodiment of the invention a standard optical reader 205 may be used to identify the recorded disk. In another preferred embodiment of the invention the label region 702 of a single-sided disk may be used for a ringcode 701. In another preferred embodiment of the invention, the ringcode 701, may be detectable by a non-standard barcode reader operating at a non-visible frequency in infra-red or ultra-violet, for example. A ring-code 701 may therefore be transparent or may be opaque, allowing a greater degree of security for proprietary identification features or codes.

In a preferred embodiment of the invention an error media error-detection system may optionally be incorporated into kiosk 200 of FIG. 2. Error detection process 800 is depicted in FIG. 8. Error detection process 800, within kiosk 200, is generally a sequential instruction set for directing a computer 612 or a processor. In step 801 a disk error detection system, item 209 of FIG. 2, is initiated. Error detection process 800 can be initiated as in step 801 automatically by kiosk system 200 or by system server 300 or by manual selection. In step 802 a recorded disk, item 214 of FIG. 2 for example, is shuttled to a disk drive mechanism, item 213 of FIG. 2 for example, for reading data. In step 803 data is read from a disk shuttled to a disk drive 213 in step 802. Data read from disk 214 in step 803 is analyzed by an algorithm in step 804 to detect data errors. If no errors are detected in step 804 then step 805 occurs and system kiosk 200 is signaled that no error was detected. In step 806 a disk with no detected data errors is shuttled to kiosk 200's media storage unit, item 207 of FIG. 2. Next, in step 807 system kiosk 200 updates a database to indicate that the error free disk is available. If a data error is detected in step 804, step 808 occurs and an error tag is generated. In step 809 kiosk 200 is signaled of an error tag attaching to the disk. In step 810 the error tagged disk is shuttled to segregated area for damaged disks within media storage unit 207. Alternatively, in step 810 a database may be updated to indicate that the disk is not available.

Figure 9:
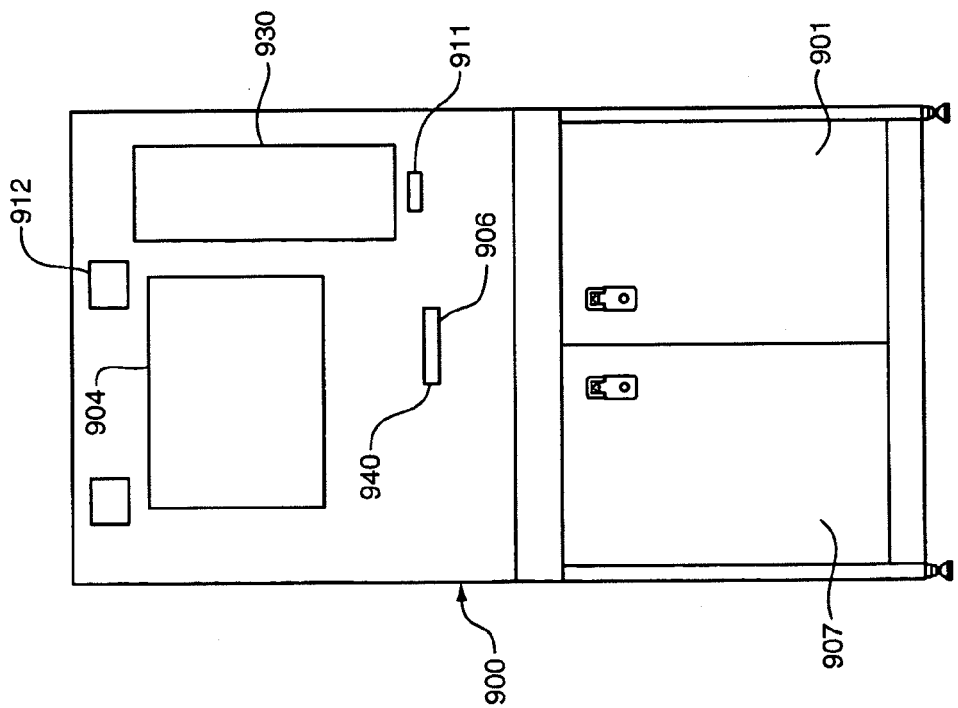
FIG. 9 is an exemplary front-view of a preferred embodiment of a kiosk.
Figure 14:
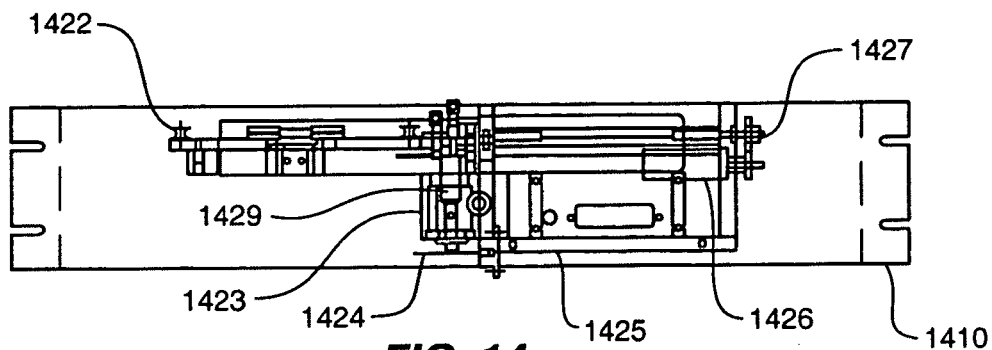
FIG. 14 is an exemplary front-view of a preferred embodiment of a disk-shuttle system.
Figure 15:
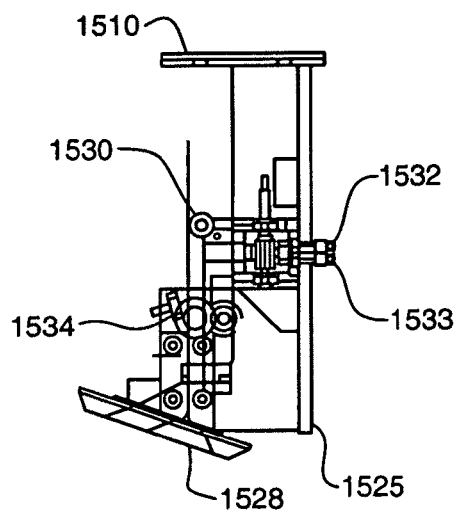
FIG. 15 is an exemplary side-view of the disk-shuttle system of FIG. 14.
Figure 16:
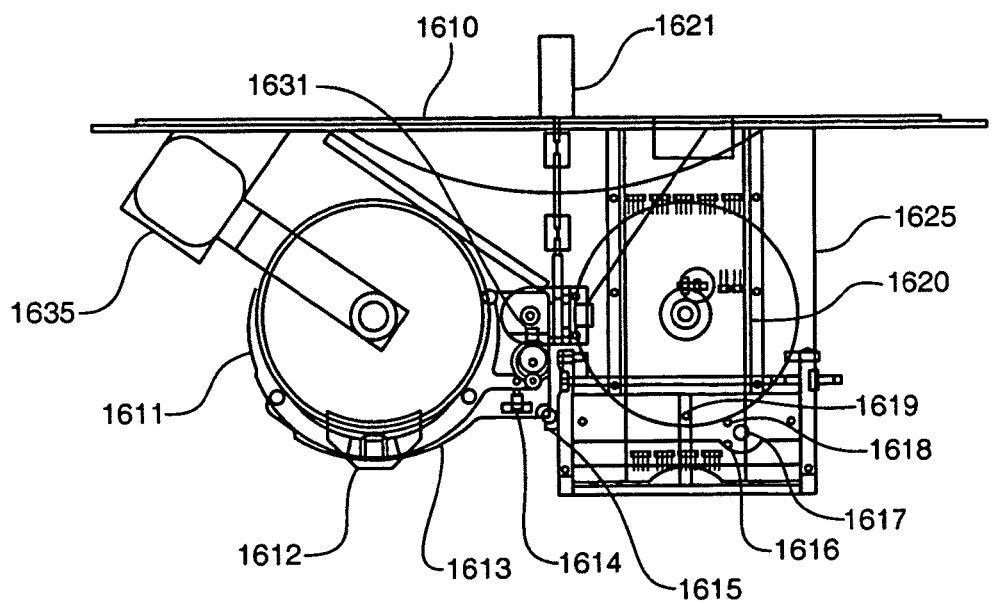
FIG. 16 is an exemplary top-view of the disk-shuttle system of FIGS. 14 and 15.

FIG. 9 is an exemplary front-view embodiment of a kiosk 200 of FIG. 2. A kiosk housing 900 forms an enclosure. A computer 901 is included inside housing 900. Computer 901 may be computer 612 of FIG. 6, or one or more components illustrated in FIG. 2, such as CPU 201. Stereo speakers 912, for audio are positioned on the front of housing 900. A touch screen display 904 is positioned on the front of housing 900. A dispense/return opening 940 is positioned on the front of housing 900. A credit-card magnetic reader 911 is positioned on the front of housing 900. A disk inventory system 907 is included internal to housing 900. A transfer mechanism/controller 906 is included in housing 900. Transfer mechanism 906 may be shuttle/carousel 206 of FIG. 2, or as illustrated in FIGS. 14-16. A sleeve dispenser 930 is positioned on the front of housing 900, for dispensing protective coverings for media. Sleeve dispenser 930 may be a mechanical device or a holding area for sleeves that requires manual extraction by a kiosk user.

Figure 10:
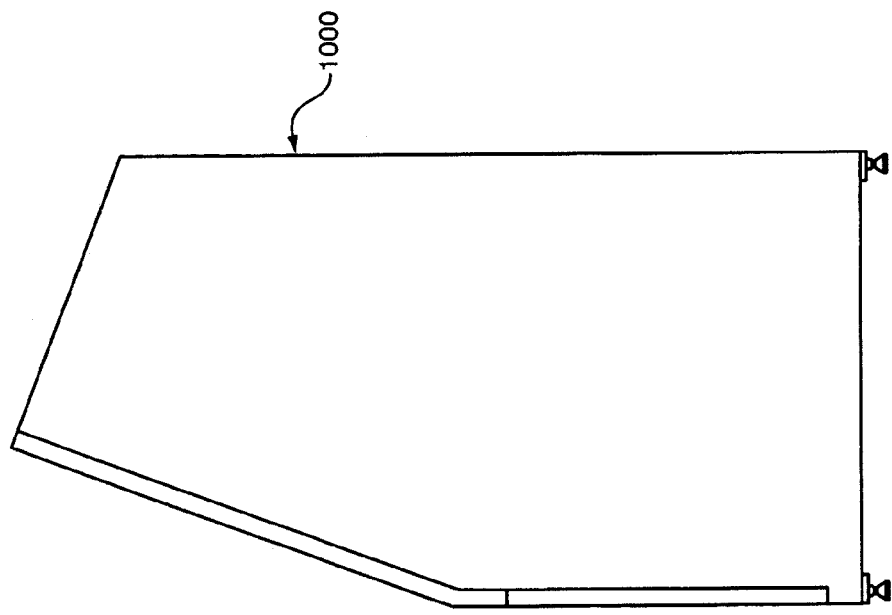
FIG. 10 is an exemplary side-view of the kiosk of FIG. 9.

FIG. 10 is an exemplary side-view embodiment of a kiosk 200 of FIG. 2, as shown in FIG. 9. A housing 1000 is identical to housing 900 of FIG. 9.

FIG. 11 is an exemplary front-view of a second kiosk 200 of FIG. 2. A bulkhead 1100 forms a base upon which components may be mounted. Stereo speakers 1112 are mounted on bulkhead 1100. A touch-screen display 1104 is mounted on bulkhead 1100. A carousel 1107, for storing media is mounted on bulkhead 1100. A carousel drive 1106 is mounted on bulkhead 1100 for driving carousel 1107. A debit/credit magnetic card reader 1111 is mounted on bulkhead 1100. A dispense/return door mechanism 1108 is mounted on bulkhead 1100. A Dispense/return door drive 1120 is mounted on bulkhead 1100 to operate dispense/return mechanism 1108. A dispense/return guide and case scanner 1105 is mounted on bulkhead 1100. Dispense/return guide 1105 may have an integrated optical scanning unit for identifying media before allowing media to be received to a kiosk.

FIG. 12 is an exemplary side view of a second kiosk 200 of FIG. 2, as illustrated in FIG. 11. A bulkhead 1200 forms a base upon which components may be mounted. Bulkhead 1200 is identical to bulkhead 1100 of FIG. 11. A dispense/return door 1240 is attached to bulkhead 1200. A media case/disk ID scanner 1205 is mounted on bulkhead 1200. Media case/disk scanner 1205 is identical to dispense/return guide and case scanner 1105 of FIG. 11.

FIG. 13 is an exemplary top view of a second kiosk 200 of FIG. 2, as shown in FIGS. 11 and 12. A bulkhead 1300 forms a base upon which components may be mounted. Bulkhead 1300 is identical to bulkhead 1100 of FIG. 11 and bulkhead 1200 of FIG. 12. A dispense/return mechanism 1308 is mounted on bulkhead 1300. Dispense/return mechanism 1308 is identical to dispense/return door mechanism 1108 of FIG. 11. A keyed or unkeyed case 1330 is mounted on bulkhead 1300.

FIG. 14 is an exemplary front-view embodiment of a shuttle/carousel system for shuttling a recorded disk as in 206 of FIG. 2 and 906 of FIG. 9. A rack-mount plate 1410 forms a base upon which components may be mounted. A transfer mechanism base 1425 forms a base for transfer mechanism components. Transfer mechanism base 1425 attaches to rack-mount 1410. A disk grip 1422 is mounted on base 1425. A transfer gearbox 1423 is mounted on transfer mechanism base 1425. An end-of-travel sensor 1424 is attached to transfer mechanism base 1425. An input/output motor 1426 is attached to transfer mechanism base 1425. An input/output shaft 1427 is attached to transfer mechanism base 1425 and operably coupled to input/output motor 1426. A clamp motor 1429 is attached to transfer mechanism base 1425.

FIG. 15 is an exemplary side-view embodiment of a shuttle/carousel system for shuttling a recorded disk as in FIG. 14. A rack-mount plate 1510 forms a base upon which components may be mounted. A transfer mechanism base 1525 forms a base for transfer mechanism components. An input/output faceplate 1528 is attached to transfer mechanism base 1525. A disk clamp 1534 for holding a recorded disk is attached to transfer mechanism base 1525. An arm-at-input sensor 1532 for detecting positional orientation is attached to transfer mechanism base 1525. An arm-at-transfer sensor 1533 for indicating positional orientation is attached to transfer mechanism base 1525. A disk support 1530 for supporting a recorded disk is attached to transfer mechanism base 1525.

FIG. 16 is an exemplary top-view embodiment of a shuttle/carousel system for shuttling a recorded disk as in FIGS. 14 and 15. A rack-mount plate 1610 forms a base upon which components may be mounted. A transfer mechanism base 1625 forms a base for transfer mechanism components. A disk transfer arm 1635 is attached to rack-mount plate 1610. A grip arm 1611 for gripping a recorded disk is attached to disk transfer arm 1635. A disk transport arm 1613 for transporting a recorded disk is operably attached to disk transfer arm 1635. A disk support/sensor 1612 is operably attached to disk transport arm 1613. An unclamp sensor 1614 is operably attached to disk transport arm 1613. An arm-clear sensor 1615 is operably attached to disk transport arm 1613. A first disk-clear pin sensor 1616 is operably attached to transfer mechanism base 1625. A disk stop pin 1617 is attached to transfer mechanism base 1625. A second disk-clear pin sensor 1618 is attached to transfer mechanism base 1625. A disk input sensor 1619 is attached to transfer mechanism base 1625. An interconnect PCBA for circuitry is attached to transfer mechanism base 1625. A transfer motor 1621 is mounted on rack mount plate 1610 and operably attached to disk transfer arm 1635.

Figure 17:
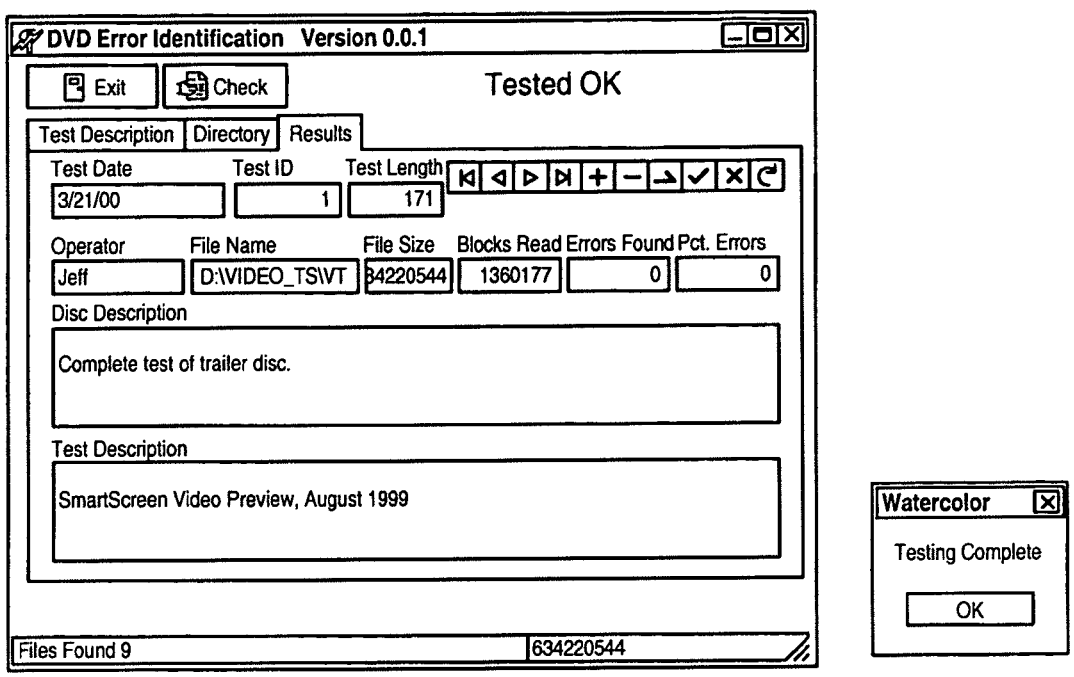
FIG. 17 is a depiction of a test result for an error correction system.

FIG. 17 depicts a graphical display of a test file result derived from the following computer code instructions when sequentially performed by a computer such as computer 612 of FIG. 6.

The following data table corresponds to the graphical display result of FIG. 17, and results from the following computer code instructions being sequentially performed by a computer such as computer 612 of FIG. 6. The table indicates information about a test-subject optical media and results of a testing algorithm that evaluates media integrity by reading error-correction data from an optical disk.

| water color | Rec ID | Test Length | Blocks Read | Errors Found | Test ID | Test Date | File Name |
| --- | --- | --- | --- | --- | --- | --- | --- |
| 6289 | 6289 | 0 | 7 | 0 | 1 | Mar. 21, 2000 | D:\VIDEO_TS\VIDEO_TS.BUP |
| 6290 | 6290 | 0 | 14 | 0 | 1 | Mar. 21, 2000 | D:\VIDEO_TS\VIDEO_TS.IFO |
| 6291 | 6291 | 1 | 1750 | 0 | 1 | Mar. 21, 2000 | D:\VIDEO_TS\VIDEO_TS.VOB |
| 6292 | 6292 | 0 | 1787 | 0 | 1 | Mar. 21, 2000 | D:\VIDEO_TS\VTS_01_0.BUP |
| 6293 | 6293 | 0 | 1824 | 0 | 1 | Mar. 21, 2000 | D:\VIDEO_TS\VTS_01_0.IFO |
| 6294 | 6294 | 0 | 2058 | 0 | 1 | Mar. 21, 2000 | D:\VIDEO_TS\VTS_01_0.VOB |
| 6295 | 6295 | 268 | 526275 | 0 | 1 | Mar. 21, 2000 | D:\VIDEO_TS\VTS_01_1.VOB |
| 6296 | 6296 | 259 | 1050498 | 0 | 1 | Mar. 21, 2000 | D:\VIDEO_TS\VTS_01_2.VOB |
| 6297 | 6297 | 171 | 1360177 | 0 | 1 | Mar. 21, 2000 | D:\VIDEO_TS\VTS_01_3.VOB |

The following computer instruction code may be used to implement a preferred embodiment of error detection process 800:

-$A+
-$B-
-$C+
-$D+
-$E-
-$F-
-$G+
-$H+
-$I+
-$J+
-$K-
-$L+
-$M-
-$N+
-$O+
-$P+
-$Q-
-$R-
-$S-
-$T-
-$U-
-$V+
-$W-
-$X+
-$YD
-$Z1
-cg
-

AWinTypes=Windows;WinProcs=Windows;DbiTypes=BDE;DbiProcs=BDE;DbiErrs=BDE;

-H+

-W+

-M

-$M16384,1048576

-K$00400000

-LE"c:\program files\borland\delphi5\Projects\Bp1"

-LN"c:\program files\borland\delphi5\Projects\Bp1"

[Compiler]

A=1

B=0

C=1

D=1

E=0

F=0

G=1

H=1

I=1

J=1

K=0

L=1

M=0

N=1

O=1

P=1

Q=0

R=0

S=0

T=0

U=0

V=1

W=0

X=1

Y=1

Z=1

ShowHints=1

ShowWarnings=1

UnitAliases=WinTypes=Windows;WinProcs=Windows;DbiTypes=BDE;DbiProcs=BDE ;DbiErrs=BDE;

[Linker]

MapFile=0

OutputObjs=0

ConsoleApp= 1

DebugInfo=0

RemoteSymbols=0

MinStackSize=16384

MaxStackSize=1048576

ImageBase=4194304

ExeDescription=

[Directories]

OutputDir=

UnitOutputDir=

PackageDLLOutputDir=

PackageDCPOutputDir=

SearchPath=

Packages=

Conditionals=

DebugSourceDirs=

UsePackages=0

[Parameters]

RunParams=
HostApplication=

[Language]
ActiveLang=
ProjectLang =$00000409
RootDir=

[Version Info]
IncludeVerinfo=0
AutoIncBuild=0
MajorVer=1
MinorVer=O
Release=0
Build=0
Debug=0
PreRelease=0
Special=0
Private=0
DLL=0
Locale=1033
CodePage=1252

[Version Info Keys]
CompanyName=
FileDescription=
FileVersion=1.0.0.0
InternalName=
LegalCopyright=
LegalTrademarks=
Original Filename=

ProductName=

ProductVersion=1.0.0.0

Comments=

```
program watercolor;
uses
Forms,
wc2 in 'wc2.pas' {fmCheck};

{$R*.RES} begin
Application.Initialize;
Application.CreateForm(TfmCheck, fmCheck);
Application.Run;
end.
object fmCheck: TfmCheck
Left = 503
Top = 178
Width = 477
Height = 387
Caption = 'DVD Error Identification Version 0.0.1'
Color = clBtnFace
Font.Charset = DEFAULT_CHARSET
Font.Color = clWindowText
Font.Height = -11
Font.Name = 'MS Sans Serif'
Font.Style = []
OldCreateOrder = False
Position = poScreenCenter
```

```
PixelsPerinch = 96
TextHeight =13
object lblResults: TLabel
Left = 168
Top = 8
Width = 298
Height = 18
Alignment = taCenter
AutoSize = False
Font.Charset = DEFAULT_CHARSET
Font.Color = clWindowText
Font.Height = -16
Font.Name = 'MS Sans Serif'
Font.Style = [fsBold]
ParentFont = False
end
object btnExit: TBitBtn
Left = 10
Top = 5
Width = 75
Height = 25
Hint ='Close and Exit to Windows'
Caption = 'E&xit'
ParentShowHint = False
ShowHint = True
TabOrder = 0
OnClick = btnExitClick
Glyph.Data = {
```

76020000424D7602000000000000760000002800000040000000100000000010004
000000000000200000000000000000000100000000000000000000000000008000
00800000080800080000000800080008080000C0C0C000808080000000FF000
0FF000000FFFF00FF000000FF00FF00FFFF0000FFFFFF0033000000000003333
388888888888F33330000000000003333388888888888F333301111111110333338
F333333338F333301BBBBBBBB033333883F3333338F3333011111111103333338
F333333338F333301IBBBBBBB0333338F83F333338F3333011111111110333338
F333333338F333301111BBBBBB0333338F383F33338F33330111111110333338
F333333338F333301110BBBBB0333338F338F33338F33330111111110333338
F333333338F333301110BBBBB0333338F338F33338F33330111111110333338
F3333333F8F333301110BBBBB0333338F338F33338F333301111111BI0333338
F333333838F333301110BBBB B0333338F338F33338F33330111111110333338
F333333338F333301110BBBBB0333338F338F33338F33330111111110333338
F33FFFFF38F333301110BBBBB0333338F338FF3338F3333011EEEEE11033333
8F388888F38F333301111B0BBBB0333338F338833338F333301IEEEE E11033333
8F38FFF8F38F3333011110BBBBB0333338F338F33338F3333011EEE EE1103333
38F388888338F3333011110BBBBB0333338F3F8F33338F333301111111103333
38F333333338F333301EI08B BBB0333338F8F8F33338F333301111111103333
38FFFFFFFFF8F333301EE0BBBBB0333338F888FFFFF8F3333000000000000333
3388888888888333330000000000003333388888888888333}

NumGlyphs = 4 end object btnCheck: TBitBtn

Left = 85

Top = 5

Width = 75

Height = 25

Hint = 'Go to Report Criteria Selection'

Caption = '&Check'

ParentShowHint = False

ShowHint = True

TabOrder = 1
OnClick = btnCheckClick
Glyph.Data = {

76020000424D76020000000000007600000028000000400000001000000010004
000000000000200000000000000000000100000000000000000000000008000
0080000000808000800000008008000808000000C0C0C000808080000000FF000
0FF000000FFFF00FF000000FF00FF00FFFF0000FFFFFF0033333000000000003
33338888888888833330000000000033333888888888833330FFFFFFFFF03F
F3F8FFFF33FFF8333330FFFFFFFFF03FF3F8F3FFFFFFF8003000000FF000F08
8F8888883F88838003000F0000000F088F888F8888888F8E00FBFBF0FFFFF08
883333FF8FF33F8E00FB0FFFFFFFFF0888338F3FFFFFFF8E0FBFB00000FF0F
088F333888883F838E0FBF0F0000000F088F338F8888888F8E0BFBFBFBFB0FF
F088F3333FFFF833F8E0BFB0FFFFFFFFF088F338F3FFFFFFF8E0FBFB00000F
F0F088F333888883F838E0FBF0F0000000F088F338F8888888F8E0BFBFBFBFB
0FFF088F33FFFFFF833F8E0BFB0FFFFFFFFF088F338F3FFFFFFF8E0FB00000
00FF0F088FF888888833838E0FB00F0000000F088FF88F8888888F8000FB0FFF
FFFFFF08883F8F333333338000FB0FFFFFFFFF08883F8F333333338333000FFF
FFFFFF0333888F3FFF33FF8333000FFFFFFFFF0333888F3FFFFFFF8333330F0
00FF0000333338F888338888333330F0000000F0333338F8888888F8333330FFF
FFF0FF0333338FFFFFF8F38333330FFFFFFFFF0333338FFFFFFFFF8333330CC
CCCC0F033333388888888F83333330999999990333338888888888333330FF
FFFF0033333338FFFFFF8833333330FFFFFFFFF0333338FFFFFFFFF83333300
000000333333338888888833333330000000000003333388888888}
  NumGlyphs = 4
end
object stsCheck: TStatusBar
  Left = 0
  Top 341
  Width = 469
  Height = 19

```
    Panels = <
    item
    Width = 300
    end
    item
    Width = 50
    end>
    SimplePanel = False
    end
object PageControl1 : TPageControl
    Left = 10
    Top = 35
    Width = 456
    Height = 276
    ActivePage = TabSheet1
TabOrder = 3
object TabSheet3: TTabSheet
    Caption = 'Test Description'
    ImageIndex = 2
    object Label16: TLabel
    Left = 10
Top = 145
Width = 77
Height = 13
Caption = 'Disc Description'
end
object Label15: TLabel
    Left = 10
    Top = 40
    Width = 77
    Height = 13
```

```
Caption ='Test Description'
end
object Label12: TLabel
    Left = 10
    Top = 0
    Width = 41
    Height = 13
Caption = 'Operator'
end
object edOperator: TEdit
    Left = 10
    Top = 15
    Width = 121
    Height = 21
TabOrder = 0
end
    object mmoTest: TMemo
    Left = 10
    Top = 55
    Width = 430
    Height = 85
    Lines.Strings = (
    ")
TabOrder = 1
end
    object mmoDisc: TMemo
    Left = 10
    Top 160
    Width = 430
    Height = 85
    Lines.Strings = (
```

```
")
  TabOrder = 2
end
end
object TabSheet1: TTabSheet
Caption = 'Directory'
object cbxDrive: TDriveComboBox
    Left = 10
    Top = 10
    Width = 200
    Height = 19
    DirList = DirectoryListBox1
  TabOrder = 0
OnChange = cbxDriveChange
end
object DirectoryListBox1: TDirectoryListBox
    Left = 10
    Top = 45
    Width = 200
    Height = 196
    FileList = flb1
    ItemHeight = 16
  TabOrder = 1
end
object flb1: TFileListBox
  Left = 220
  Top = 10
  Width = 200
  Height = 231
ItemHeight = 13
  TabOrder = 2
```

```
    end
  end
  object TabSheet2: TTabSheet
    Caption = 'Results'
    ImageIndex = 1
    object Label1: TLabel
      Left = 10
      Top =85
      Width = 77
      Height = 13
      Caption = 'Disc Description'
    end
    object Label2: TLabel
      Left = 115
      Top = 0
      Width = 35
      Height = 13
      Caption = Test ID'
    end
    object Label3: TLabel
      Left = 10
      Top = 0
      Width = 47
      Height = 13
      Caption = 'Test Date'
    end
    object Label4: TLabel
      Left = 10
      Top = 165
      Width = 77
      Height = 13
```

Caption = 'Test Description' end object Label5: TLabel

Left = 190

Top 45

Width = 39

Height = 13

Caption = 'File Size' end object Label6: TLabel

Left = 90

Top = 45

Width = 47

Height = 13

Caption = 'File Name' end object Label7: TLabel

Left = 180

Top =0

Width = 57

Height = 13

Caption = 'Test Length' end object Label8: TLabel

Left = 10

Top 45

Width = 41

Height = 13

Caption = 'Operator' end object Label10: TLabel

```
    Left = 375
    Top 45
    Width = 46
    Height = 13
  Caption = 'Pct Errors'
end
object Label11: TLabel
    Left = 310
    Top 45
    Width = 60
    Height = 13
  Caption = 'Errors Found'
end
object Label9: TLabel
    Left = 245
    Top = 45
    Width = 61
    Height = 13
  Caption = 'Blocks Read'
end
object DBNavigator1: TDBNavigator
    Left = 240
    Top = 5
    Width = 200
    Height = 18
  DataSource = DataSource1
  TabOrder = 0
end
object DBMemo1: TDBMemo
    Left = 10
    Top = 180
```

```
    Width = 426
    Height = 60
  Data Field = 'TestDescription'
  DataSource = DataSource1
  TabOrder = 1
end
object DBMemo2: TDBMemo
    Left = 10
    Top = 100
    Width = 426
    Height = 60
  DataField = 'DiscDescription'
  DataSource = DataSource1
  TabOrder = 2
end
object DBEdit1: TDBEdit
    Left = 190
    Top=60
    Width = 50
    Height = 21
  DataField = 'FileSize'
  DataSource = DataSource1
  TabOrder = 3
end
object DBEdit2: TDBEdit
    Left = 10
    Top = 60
    Width = 75
    Height = 21
  DataField = 'Operator'
  DataSource = DataSource1
```

```
TabOrder = 4
end
object DBEdit3: TDBEdit
  Left = 245
  Top = 60
  Width = 60
  Height = 21
  DataField = 'BlocksRead'
  DataSource = DataSource1
  TabOrder = 5
end
object DBEdit4: TDBEdit
  Left = 310
  Top = 60
  Width = 60
  Height = 21
  DataField = 'ErrorsFound'
  DataSource = DataSource1
  TabOrder = 6
end
object DBEdit5: TDBEdit
  Left = 375
  Top = 60
  Width = 60
  Height = 21
  Data Field = 'PctErrors'
  DataSource = DataSource1
  TabOrder = 7
end
object DBEdit6: TDBEdit
  Left = 10
```

```
    Top = 15
    Width = 100
    Height = 21
  Data Field = 'TestDate'
  DataSource = DataSource1
  TabOrder = 8
  end
  object DBEdit7: TDBEdit
    Left = 90
    Top = 60
    Width = 96
    Height = 21
  DataField = 'FileName'
  DataSource = DataSource1
  TabOrder = 9
  end
  object DBEdit8: TDBEdit
    Left = 115
    Top=15
    Width = 60
    Height = 21
  DataField = TestId'
  DataSource = DataSource1
  TabOrder = 10
  end
  object DBEdit9: TDBEdit
    Left = 180
    Top = 15
    Width = 55
  Height = 21
  DataField = 'TestLength'
```

```
    DataSource = DataSource1
    TabOrder = 11
  end
 end
end
object tblResults: TTable
 Active = True
 DatabaseName = 'iat'
 TableName = 'watercolor.DB'
  Left = 50
  Top = 15
end
object DataSource1 : TDataSource
 DataSet = tblResults
  Left = 30
  Top = 20
end
end
unit wc2;

interface uses
Windows, Messages, SysUtils, Classes, Graphics, Controls, Forms, Dialogs,
ExtCtrls, DBCtrls, ComCtrls, Db, DBTables, StdCtrls, Buttons, FileCtrl,
Mask, Math;

type
  TfmCheck = class(TForm)
    btnExit: TBitBtn;
```

```
btnCheck: TBitBtn;
tblResults: TTable;
DataSource1: TDataSource;
stsCheck: TStatusBar;
PageControl1: TPageControl;
TabSheet1: TTabSheet;
TabSheet2: TTabSheet;
DBNavigator1: TDBNavigator;
cbxDrive: TDriveComboBox;
DirectoryListBox1: TDirectoryListBox;
flb1: TFileListBox;
TabSheet3: TTabSheet;
edOperator: TEdit;
Label1: TLabel;
Label2: TLabel;
Label3: TLabel;
Label4: TLabel;
Label5: TLabel;
Label6: TLabel;
Label7: TLabel;
Label8: TLabel;
Label10: TLabel;
Label11: TLabel;
mmoTest: TMemo;
mmoDisc: TMemo;
Label16: TLabel;
Label15: TLabel;
Label9: TLabel;
Label12: TLabel;
DBMemo1: TDBMemo;
DBMemo2: TDBMemo;
```

```
    DBEdit1: TDBEdit;
    DBEdit2: TDBEdit;
    DBEdit3: TDBEdit;
    DBEdit4: TDBEdit;
    DBEdit5: TDBEdit;
    DBEdit6: TDBEdit;
    DBEdit7: TDBEdit;
    DBEdit8: TDBEdit;
    DBEdit9: TDBEdit;
    lblResults: TLabel;
    procedure btnExitClick(Sender: TObject);
    procedure btnCheckClick(Sender: TObject);
    procedure cbxDriveChange(Sender: TObject);
    procedure CheckFile(stFile: String; iFileSize: Integer);
private
  { Private declarations }
public
  { Public declarations }
end;

var
fmCheck: TfmCheck;
iErrorsFound, iBlocksread: Integer;

implementation

{$R *.DFM} procedure TfmCheck.btnExitClick(Sender: TObject);
begin
  Close;
end;
```

```
procedure TfmCheck.btnCheckClick(Sender: TObject);
var
iCount, iDirSize, iLastDirSize : Integer;
stDir, stLastDir : String;

procedure SearchTree;
var
  SR   : TSearchRec;
  iError     : Integer;
begin
  iLastDirSize := iDirSize;
  stLastDir := stDir;
  iDirSize := 0;
  iError := FindFirst('*.*', 0, SR);
  GetDir(0, stDir);
  if stDir[Length(stDir)] <> '\' then stDir := stDir +'\';
  while iError = 0 do
begin
    try
    begin
iCount := iCount + 1;
CheckFile(stDir+SR.Name, SR.Size);
end
except
  on EOutOfResources do
  begin
    MessageDlg('Number of files exceeds list box capacity.',
      mtInformation, [mbOk], 0);
   Abort;
end; //on EOutOfResources do
```

```
end; //except
iError := FindNext(SR);
end; //while iError = 0 do iError := FindFirst('*.*', faDirectory, SR);
  while iError = 0 do
  begin
    if ((SR.Attr and faDirectory = faDirectory) and
    (SR.Name <>'.') and (SR.Name <>'..')) then
    begin
    ChDir(SR.Name);
    SearchTree;
    ChDir('..');
    end;
    iError := FindNext(SR);
  end;
end;

begin
  Screen.Cursor := crHourglass;
  try
    iBlocksRead := 0;
    iErrorsFound := 0;
    stsCheck.Panels[0].Text := 'Searching ... Please Wait.';
    stsCheck.Update;
    iCount := 0;
    {ChDir(copy(cbxDrive.Text,1,1)+':l');}
    {ShowMessage(cbxDrive.Text);}
    {ShowMessage(DirectoryListBox1.Directory);)
    ChDir(DirectoryListBox1.Directory);
    SearchTree;
```

```
    stsCheck.Panels[0].Text := 'Files Found: ' + IntToStr(iCount);
    stsCheck.Update;
    if iBlocksRead > 0 then
    if iErrorsFound/iBlocksRead < 0.05 then
begin
    lblResults.Font.Color := clGreen;
    lblResults.Caption := 'Tested OK';
    end
    else
    begin
    lblResults.Font.Color := clRed;
    lblResults.Caption := 'Disc Suspect';
    end;
    finally
    Screen.Cursor := crDefault;
    end;
    beep;
    ShowMessage('Testing Complete');
end;

procedure TfmCheck.CheckFile(stFile: String; iFileSize:Integer);
var
i, iTestLength, iNumRead: Integer;
dtStart: TDateTime;
Buf: array[1..2048] of Char;
{F: File;}
{F:textfile;}
F:file of byte;

iFileHandle: Integer;
iFileLength: Integer;
```

```
iFileStart: Integer;
iBytesRead: Integer;
Buffer: PChar;
begin
stsCheck.Panels[0].Text := stFile;
stsCheck.Update;
tblResults.Active := True;
dtStart := Now();
try
if not FileExists(stFile) then
begin
MessageDlg('File: ' + stFile +
' not found', mtError, [mbOk], 0);
end
else
begin
{AssignFile(F, stFile);}
{ShowMessage(inttohex(TFileRec(F).mode,8));}
{tFileRec(F).mode :=$D7B1;}
{ $I-)
   {Reset(F, 1);}
   {Reset(F);} iFileHandle := FileOpen(stFile, fmOpenRead or fmShareDenyNone);
   {if iFileHandle > 0 then valid file handle else invalid}

{ $1+}
   {ShowMessage(inttohex(TFileRec(F).mode,8));}
   {iFileSize := FileSize(F);}
   iFileLength := FileSeek(iFileHandle,0,2);
   iFileStart := FileSeek(iFileHandle,0,0);
```

```
repeat
try
{BlockRead(F, Buf, SizeOf(Buf), iNumRead);}

{Buffer := PChar(AllocMem(iFileLength + 1));
iNumRead := FileRead(iFileHandle, Buffer, iFileLength);}
stsCheck.Panels[1].Text := IntToStr(FileSeek(iFileHandle, 0, 1));
stsCheck.Update;
iNumRead := FileRead(iFileHandle, Buf, SizeOf(Buf));
{ShowMessage(inttostr(iNumRead));}
if iNumRead=-1 then {error but no exception thrown}
begin
  Inc(iErrorsFound);
  FileSeek(iFileHandle, SizeOf(Buf), 1); {move forward in file}
end;

except
Inc(iErrorsFound);
end;
Inc(iBlocksRead);
until (iNumRead = 0);
{CloseFile(F);}

FileClose(iFileHandle
{FreeMem(Buffer);} with tblResults do
begin
    Append;
    FieldByName('TestLength').AsInteger := Floor(24*60*60*(Now-dtStart));
    FieldByName('BlocksRead').AsInteger := iBlocksRead;
```

```
      FieldByName('ErrorsFound').AsInteger := iErrorsFound;
      FieldByName('TestID').AsInteger := 1;
      FieldByName('TestDate').AsDateTime := Now();
      FieldByName('Filename').AsString := stFile;
      FieldByName('Operator').AsString := edOperator.Text;
      FieldByName('DiscDescription').AsString := mmoDisc.Text;
      FieldByName(TestDescription').AsString := mmoTest.Text;
      FieldByName('Filesize').AsInteger := iFileSize;
      FieldByName('PctErrors').AsFloat := iErrorsFound/iBlocksRead;
Post;
end;
end;
except
end;
end;

procedure TfmCheck.cbxDriveChange(Sender: TObject);
begin
    DirectoryListBox1.Drive := cbxDrive.Drive;
    flb1.Drive := cbxDrive.Drive;
    flb1.Directory := DirectoryListBox1.Directory;
  end;
end.
```

The above is a description of a method and system for Internet-based automated disk distribution and retrieval. It is expected that others will design alternative methods and systems for Internet-based disk distribution using stand-alone automated kiosks as set forth in the claims below either literally of through the Doctrine of Equivalents.

The invention claimed is:

1. A system for dispensing optical storage media from, and maintaining inventory in, a kiosk, the kiosk remote from a system server and communicatively connected to said system server, said system comprising:
   a plurality of optical storage media each storing data for a particular program;
   a storage carousel in the kiosk for storing said plurality of optical storage media, the kiosk inventory comprising an inventory of said plurality of optical storage media; a first central processing unit in said kiosk;
   a database including information representative of the kiosk inventory and accessible by a user via a kiosk interface and the Internet;
   a first media readable by said first central processing unit, having a first set of instructions for directing said first central processing unit to:
      read data from a selected one of said plurality of optical storage media stored in said kiosk;
      dispense said selected one of said plurality of optical storage media and/or display data from said selected optical medium on a display in said kiosk; and
      receive a returned optical medium, identify said returned optical medium, determine playability of the returned optical medium based on scanning the returned optical medium for error detection, and transmit identity of said returned optical medium to said system server;
      maintain information of the kiosk inventory; remove a one of said optical storage media from said kiosk inventory information when dispensing said selected one; add a one of said optical storage media to said kiosk inventory information when receiving said returned optical medium;
   a second central processing unit in said system server, having a second media including a second set of instructions for directing said second central processing unit to:
      maintain an inventory of optical storage media in said kiosk in said database;
      receive a message indicating said returned optical storage medium has been returned to the kiosk;
      receive an update of the kiosk inventory from said first central processing unit when said first central processing unit updates said kiosk inventory information; and
      cause optical storage media to be added to the kiosk inventory based on said kiosk inventory information.

2. The system of claim 1, further comprising an optical reading device.

3. The system of claim 1, wherein said second set of instructions further comprises instructions for directing said second central processing unit to provide access to a database of a third central processing unit.

4. The system of claim 1, further comprising a media identification reader in said kiosk that is operable to detect an identification marking on one of said selected and returned optical storage media.

5. The system of claim 4, wherein said first set of instructions includes instructions for directing said first central processing unit to:
   read said identification marking on a one of said selected and returned optical storage medium using said media identification reader, and identify said selected or returned optical storage medium.

6. The system of claim 5, wherein said first set of instructions further comprises instructions for directing said first central processing unit to maintain a record of a position of said optical recording storage media in the kiosk based upon said identification of said selected and returned optical storage media.

7. The system of claim 4, wherein said identification marking on said optical storage media includes a concentric marking around a center of an optical storage medium.

8. The system of claim 7, wherein said concentric marking is a bar code.

9. The system of claim 8, wherein said media identification reader is a bar code scanner.

10. The system of claim 1 further comprising:
   directing said first central processing unit to generated disk imperfection data; and
   tracking degradation of disk quality over successive rentals of the returned optical medium.

* * * * *

UNITED STATES PATENT AND TRADEMARK OFFICE
CERTIFICATE OF CORRECTION

| | | |
|---|---|---|
| PATENT NO. | : 8,639,578 B2 | Page 1 of 1 |
| APPLICATION NO. | : 12/257193 | |
| DATED | : January 28, 2014 | |
| INVENTOR(S) | : William H. Barber et al. | |

It is certified that error appears in the above-identified patent and that said Letters Patent is hereby corrected as shown below:

In the Specification
In column 5, line 37, delete "connectabilty" and insert -- connectability --, therefor.

In the Claims
In column 67, claim 1
Line 34, delete the word "a";
Line 37, after "one;" insert -- and --;
Line 37, delete the word "a".

Signed and Sealed this
Second Day of September, 2014

Michelle K. Lee
*Deputy Director of the United States Patent and Trademark Office*